(12) United States Patent
Britt et al.

(10) Patent No.: US 7,305,252 B2
(45) Date of Patent: Dec. 4, 2007

(54) SYSTEM AND METHOD FOR SERVICE NAMING AND RELATED DIRECTORY STRUCTURE IN A MOBILE DATA NETWORK

(75) Inventors: Lysaa Britt, Mouans-Sartoux (FR); Jean-Francois Maion, Espoo (FI); Ritva Sirén, Helsinki (FI)

(73) Assignee: Nokia Corporation, Espoo (FI)

( * ) Notice: Subject to any disclaimer, the term of this patent is extended or adjusted under 35 U.S.C. 154(b) by 360 days.

(21) Appl. No.: 10/730,008

(22) Filed: Dec. 9, 2003

(65) Prior Publication Data

US 2005/0124382 A1    Jun. 9, 2005

(51) Int. Cl.
*H04M 1/00* (2006.01)
(52) U.S. Cl. .............. 455/556.2; 455/456.1; 455/414.2; 709/228; 709/227; 709/217
(58) Field of Classification Search ........... 455/456, 455/556.2, 456.1, 414.2; 709/228, 227, 217
See application file for complete search history.

(56) References Cited

U.S. PATENT DOCUMENTS

| | | | |
|---|---|---|---|
| 6,356,761 B1 * | 3/2002 | Huttunen et al. | 455/456.1 |
| 6,725,268 B1 * | 4/2004 | Jackel et al. | 709/227 |
| 2001/0047395 A1 * | 11/2001 | Szutu | 709/217 |
| 2002/0083029 A1 * | 6/2002 | Chun et al. | 706/45 |
| 2002/0133598 A1 * | 9/2002 | Strahm et al. | 709/228 |

* cited by examiner

*Primary Examiner*—Joseph Feild
*Assistant Examiner*—Pierre-Louis Desir
(74) *Attorney, Agent, or Firm*—Banner & Witcoff, Ltd.

(57) ABSTRACT

In response to a request by a mobile terminal for an information resource associated with a generic service name, one wireless network provides an IP address for a first provider of information. Another wireless network, in response to the same generic service name, provides an IP address for a different information provider. Other wireless networks will provide addresses for still other providers. Upper level generic service names include one or more hierarchically-arranged lower levels of generic service names. This tree of generic service names is used to create, in a consistent manner in different wireless networks, a generic directory of accessible information resources. In certain embodiments, a mobile terminal determines its location and provides location information with (or in connection with) a generic service name.

45 Claims, 15 Drawing Sheets

SYSTEM AND METHOD FOR SERVICE NAMING AND RELATED DIRECTORY STRUCTURE IN A MOBILE DATA NETWORK

FIELD OF THE INVENTION

The present invention relates to systems and methods for accessing Internet-based information resources from a wireless mobile device. In particular, the invention concerns simplifying the manner in which a user is able to locate a desired information resource.

BACKGROUND OF THE INVENTION

Mobile communication has become an important aspect of modern life. Mobile communication terminals (and related communication networks) have evolved from simple wireless telephony to now offering a multitude of services. In addition to wireless telephone service, many mobile communication terminals now offer access to the Internet and to other data communication networks.

FIG. 1 illustrates one existing method by which a mobile device accesses information resources via the Internet. Using browser software operating on a processor on mobile terminal 10, the user selects a desired information resource ("www.*news.com"). Fictitious resource names are used as illustrative examples throughout the Background and Detailed Description portion of this specification. These fictitious resource names (which include fictitious Internet domain names) will often include "*", "#" and other characters not found in actual domain names under accepted Domain Naming System convention. Example resource names are also placed within quotation marks (e.g., "www.*website.com").

Mobile terminal 10 communicates an information resource selection to the wireless network with which mobile terminal 10 is currently in communication (step 1). Although not shown, mobile terminal 10 transmits via wireless link to a base station, which then communicates via one or more wired or wireless network connections with a domain name server (DNS) maintained by the wireless network. The wireless network DNS receives the query from mobile terminal 10, and then forwards a query to a root server for the ".com" top level domain (TLD). In response, the ".com" root server returns to the wireless network DNS an Internet Protocol (IP) address of a name server for the "*news.com" domain (step 3). The wireless network DNS then forwards a domain name query via the Internet to the "*news.com" DNS (step 4). The DNS for "*news.com" then returns the IP address (183.124.54.153) for "www.*news.com" (step 5). The wireless network DNS returns the IP address for "www.*news.com" to mobile terminal 10 (step 6). Software within mobile terminal 10 then initiates a connection to the IP address for "www.*news.com" (step 7). In practice, a DNS query may be handled by a proxy instead of the mobile terminal. In other words, after the mobile terminal user selects the desired Internet information resource, the selection is communicated to a proxy within the wireless network. The proxy then communicates with the wireless network DNS and establishes the connection to the desired Internet information resource. The previous example also represents a recursive case wherein the wireless network DNS requests additional information from other DNS servers. In some systems, the wireless network DNS instructs the mobile terminal (or proxy) to directly request additional information from the ".com" root server.

Because of limited memory, many mobile terminals can only retain a limited number of URLs (such as "www.*news.com" from the preceding example), bookmarks, or other stored references to desired Internet information resources. When it is necessary to identify other resources, the user must typically browse through links from available on-line resources or find such resources using a search engine. For various reasons, browsing from a mobile terminal over a wireless network can be more difficult than when using a personal computer (PC) or other computer with more capabilities.

For example, mobile communication terminals often have smaller processing and data storage capacities by comparison to laptop, personal and other computers used for wired access to the Internet. Browser software operated on mobile terminals may have fewer features and capabilities than browser software operated on a laptop computer or PC. Many mobile terminals also have smaller display devices than are typically found on other types of computers. This often prevents a user from viewing more than a small number of selectable hyperlinks at any one time. Although it may be possible to scroll through selections, many users find it difficult to keep track of the available selections in screens that are not currently displayed. Consequently, it is often desirable in the wireless access context to use shorter service indices (e.g., shorter lists of available links) and fewer layers of such indices. This can present a challenge.

Other challenges of wireless Internet access can arise when services are provided via a wireless access protocol (WAP) portal maintained by a wireless network operator. Different operators do not always configure their portals in the same manner. A roaming user accessing an unfamiliar portal may be unaccustomed to that portal, and thus less likely to find the desired information resources. Indeed, finding the visited operator portal can be a challenge in itself.

Network access charges for wireless browsing are often more expensive that browsing from a PC or other computer having wired network access. Wireless communication networks typically offer a more restricted data transmission rate than is available for wired Internet access. Searching and browsing is therefore often slower than when using a wired connection. After entering a search term or selecting a hyperlink, a wireless network user may have to wait a relatively long time for additional selectable links to be downloaded.

These various challenges can be aggravated by the nature of mobile terminal use. In particular, mobile terminals are typically used in environments where convenience, ease of use and speed are major concerns. Often, a mobile terminal user is in transit or otherwise in a situation in which the mobile terminal may be the only information resource available. Users are often in a hurry and/or using a mobile terminal while standing or while located in a distracting environment (e.g., in an airport, etc.). Providing substantial amounts of user input before obtaining a desired information item or waiting for a response can be problematic under these conditions. Although some mobile terminals have an expanded keyboard or otherwise provide the capacity for entering specific text or other characters, input of text with a mobile terminal is often more time consuming that when using a larger keyboard.

As the foregoing illustrates, there remains a need for improved methods and systems for finding and selecting information resources when using a mobile communication terminal.

SUMMARY OF THE INVENTION

The present invention addresses many of the previously described challenges through the use of service names that are recognized as generic by multiple wireless networks. In response to a request by a mobile terminal for an information resource named under such a generic service name, one wireless network may provide an IP address for a first provider of information. Another wireless network, in response to the same generic service name, may provide an IP address for a different information provider. Other wireless networks will provide addresses for still other providers. Upper level generic service names may also include one or more hierarchically arranged lower levels of generic service names. This tree of generic service names may further be used to create, in a consistent manner in different wireless networks, a generic directory of accessible information resources. In certain embodiments, a mobile terminal determines its location and provides location information as part of (or in connection with submission of) a generic service name.

In a first embodiment, the invention includes a method for accessing Internet information resources via a wireless mobile terminal. A first generic service name is submitted to a first wireless network. In response to that submission, a mobile terminal accesses a first Internet information resource mapped to the first generic service name by the first wireless network. The mobile terminal submits a second generic service name to the first wireless network and then accesses a second Internet information resource mapped to the second generic service name by the first wireless network. The mobile terminal later submits one of the first or second generic service names to a second wireless network and accesses, in response to said submission to the second wireless network, a third Internet information resource. The third resource is mapped to the first or second generic service name by the second wireless network, and is distinct from the information resource mapped to the first or second generic service name by the first wireless network. In a second embodiment, the invention includes a mobile communication terminal having a communications interface, an input device, a processor and a memory. Stored on the memory are machine-executable instructions which, when executed by the processor, cause the mobile terminal to perform steps similar to the steps of the first embodiment. In a third embodiment, the invention includes a machine-readable medium having machine-executable instructions for performing steps similar to the steps of the first embodiment.

Additional embodiments, as well as other features and advantages of the present invention, will be apparent and understood from the following detailed description of preferred embodiments, taken in connection with the appended drawings.

DETAILED DESCRIPTION OF THE PREFERRED EMBODIMENTS

As used herein, "mobile terminal" includes cellular and other wireless telephones, mobile devices communicating by General Packet Radio Service to send and receive data, devices permitting wireless Internet telephony, and any other mobile communication device that facilitates wireless two-way communication between a user of the device and another location (including, e.g., a cellular telephone coupled to a personal digital assistant or to a laptop or other portable computer). "Mobile terminal also includes terminals which can be connected to a network in different locations, but are not capable of supporting all functions of mobility.

Figure 2:
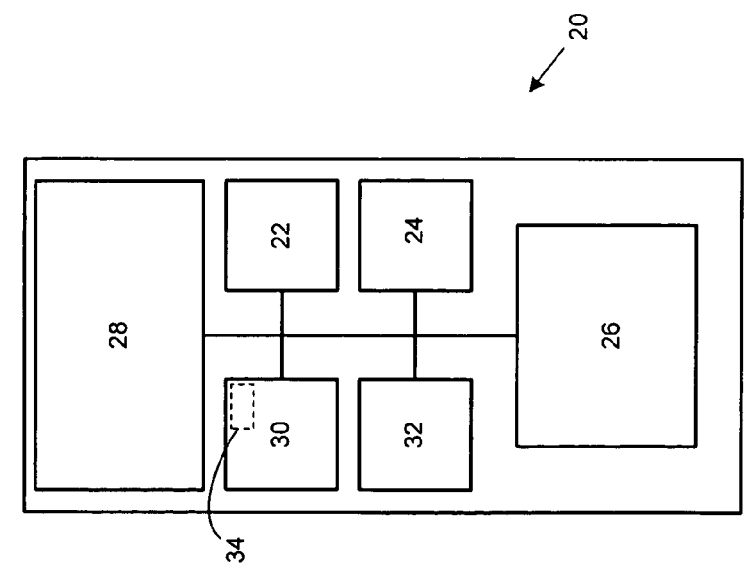
FIG. 2 is a functional diagram of a mobile terminal according to at least one embodiment of the invention.

FIG. 2 is a functional diagram of a mobile terminal 20 according to at least one embodiment of the invention. Mobile terminal 20 generally includes at least one communications interface 22, inputs (e.g., keypad 26 and audio/visual inputs 24), display 28, memory 30 and processor 32. Communications interface 22 includes components needed to transmit and receive information (whether voice, data or other information) via a wireless network. Audio/visual inputs 24 may include, e.g., a microphone and/or a camera. A user of the mobile terminal 20 provides input via keypad 26 to access features of mobile terminal 20. Operation of mobile terminal 20 is controlled by a processor 32, which receives instructions and data from, and stores data to, memory 30. One type of program operating upon mobile terminal 20 includes a browser 34, features of which are described below. Mobile terminal 20 is only one example of a possible mobile or portable terminal in accordance with the invention.

The present invention addresses many of the previously described challenges associated with accessing Internet information resources via a mobile terminal. Often, a user of a mobile terminal may not be concerned with accessing a specific provider of a type of information, so long as the information is quickly and conveniently obtained. For example, a user of mobile terminal 20 may be in a meeting or some other location and have a need to view the current news headlines or other information about major events. Often, the same general content (e.g., major news events of the day, stock market indices, etc.) is available from a variety of on-line sources, and a user is indifferent to the actual provider accessed. Instead, the user is more concerned with quickly finding a source of the desired information and then quickly accessing that information.

In at least one embodiment of the invention, a mobile terminal such as mobile terminal 20 utilizes generic service names to access various types of information. In at least one embodiment, a generic service name has the general format of an Internet domain name or of some other type of Uniform Resource Locator (URL) or Uniform Resource Identifier (URI). However, these generic service names are reserved for use by one or more wireless networks as described herein. In response to a request by mobile terminal 20 for an information resource associated with such a generic service name, one wireless network will provide an IP address for a first provider of information. Another wireless network, in response to the request seeking information with the same generic service name, will provide an IP address for a different information provider. Other wireless networks may provide addresses for still other providers.

In at least one embodiment, by previous agreement among multiple wireless network operators, certain domain names are reserved for use as (or in connection with) generic service names. As used herein, "domain name" (sometimes called a "DNS name") refers to a name that is resolvable into an IP address for an Internet information resource. Each wireless network operator determines an actual domain name and (and thus IP address) to which one or more generic service names is mapped. As used herein, "actual domain name" refers to a domain name not set aside for use as a generic service name. The reserved domain names can be assigned one or more specific top level domains (TLDs) and/or assigned into sub-domains of one or more TLDs. Notably, the invention is not limited to geographic distinctions between wireless network operators. In some embodiments, two wireless networks operating within the same region and providing separate DNS services map the same group of generic service names to different actual domain names (and thus to different IP addresses).

Figure 3:
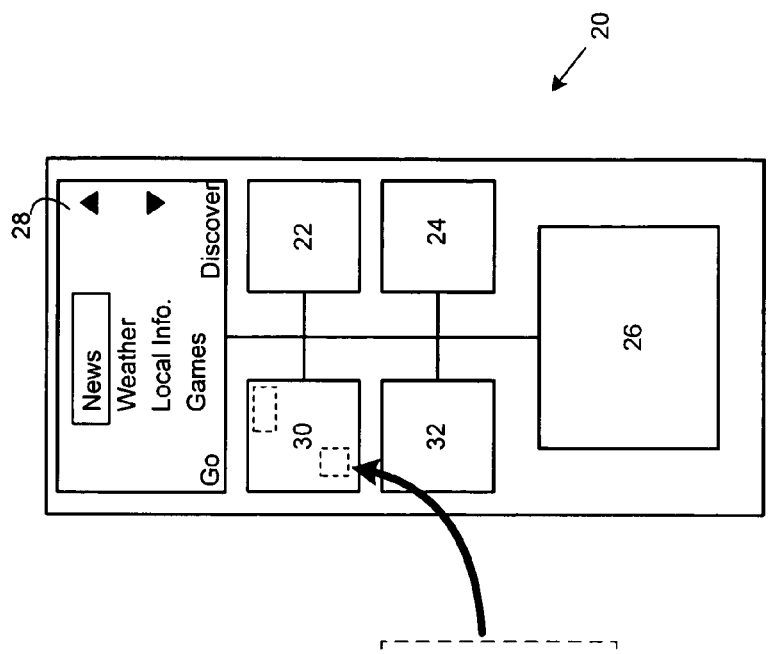
FIG. 3 is a further functional diagram of the mobile terminal of FIG. 2.

FIG. 3 also shows mobile terminal 20, but shows some of the data stored in memory 30. As seen in FIG. 3, stored in memory 30 are multiple generic service names 36. For purposes of the example, generic service names are shown as having the top level domain ".mobi", although other top level domains could be used. Generic service names 36 could have been stored in memory 30 in various manners. In certain embodiments, generic service names are allocated a short time-to-live (TTL) parameter within the DNS of a wireless network, thereby limiting the time these names are cached in a mobile terminal. In that embodiment, the generic service names are briefly stored after retrieval from a wireless network (so that, e.g., a user may select from among the retrieved names), but must be frequently re-requested from the wireless network. In other embodiments, one or more generic service names are cached for a longer period of time, and other generic service names are retrieved as needed. In these other embodiments, a TTL parameter for groups of names is defined based on a meaningful time any set of names is assumed be valid after retrieval. Longest TTL parameters may be used for service names having a global scope.

Each generic service name 36 corresponds to a generic category of information. For example, "news.mobi" corresponds to sources of information about news and current events. The generic service name "weather.mobi" corresponds to sources of information about weather conditions (not necessarily in the region in which mobile terminal 20 is currently located). The generic domain name "localinfo.mobi" corresponds to information about local attractions, restaurants, etc. The generic service name "games.mobi" corresponds to on-line games, puzzles, etc. These examples are only illustrations, and numerous other types of generic service names are possible.

Figure 4:
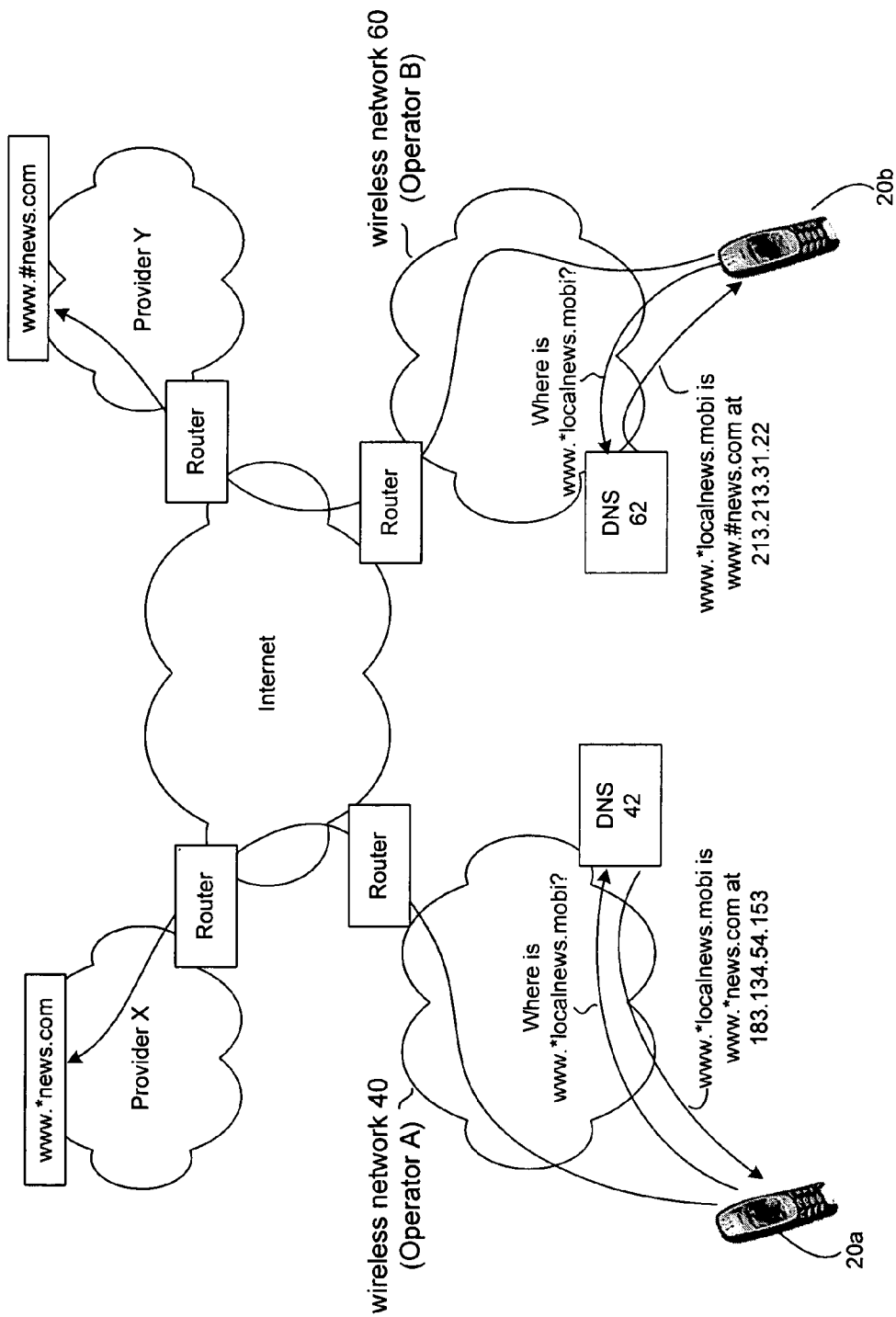
FIG. 4 is a block diagram showing the same generic service name mapped to different targets by two different wireless networks.

FIG. 4 shows how the same generic service name is treated differently by two different wireless networks. A user of mobile terminal 20a is in communication with wireless network 40 operated by Operator A. A user of mobile terminal 20a selects "www.*localnews.mobi" on mobile terminal 20a. The user may select "www.*localnews.mobi" in various ways. As shown in FIG. 3, a user could be presented with a list of information categories. The user would then highlight the desired category and press a key corresponding to "Go" (or some other key signaling the selection). In other embodiments, a user could input "www.*localnews.mobi" or other generic service name into a text window. In at least one embodiment, generic service names are intuitively based on the type of information retrievable from the service provider selected by a wireless network operator.

After selecting "www.*localnews.mobi", mobile terminal 20a transmits that generic service name in a query to DNS 42. The query is sent as a Transmission Control Protocol (TCP) or User Datagram Protocol (UDP) packet over the IP network and includes a query type (QTYPE) code requesting translation of a name to an IP address. The query further includes the host name ("www.*localnews.mobi") to be resolved. DNS 42 of wireless network 40 receives this transmission via a base station, intermediate switching center(s) and other facilities known in the art (not shown). Because the transmitted service name ("www.*localnews.mobi") is one of a number of domain names previously set aside for use as a generic service name, a trigger within software operating on DNS 42 recognizes the generic service name, and consults a lookup table for generic service names. In this case, Operator A has previously determined that "www.*localnews.mobi" will be mapped to an IP address of an Internet web server operated by Provider X and having a host name "www.*news.com". Accordingly, DNS 42 returns to mobile terminal 20a the IP address for "www.*news.com". Using the IP address transmitted by DNS 42, mobile terminal 20a then connects with the web server operated by Provider X. In at least one preferred embodiment, connection to an Internet information resource is automatic upon selection of a generic service name. In other words, and using the present example, the user of mobile terminal 20a is not required to provide further input after selecting "www.*localnews.mobi". In certain embodiments, mobile device 20a communicates with DNS 42 and with the Provider X web server via a proxy.

Mobile terminal 20b, which is similar to mobile terminal 20a but owned by another user, is in communication with wireless network 60 operated by Operator B. The user of mobile terminal 20b also selects "www.*localnews.mobi". Wireless network 60 may be within the same geographic region as that served by wireless network 40, may be in a different region, or may be in a region partially overlapping that of wireless network 40. DNS 62 of wireless network 60 receives this transmission (also via a base station, intermediate switching center(s) and other facilities known in the art), and also recognizes a generic service name. In this case, Operator B has previously determined that "www.*localnews.mobi" will be mapped to an IP address for an Internet web server operated by Provider Y and having a host name of "www.#news.com". Accordingly, DNS 62 returns to mobile terminal 20b the IP address for "www.#news.com". Using the IP address transmitted by DNS 62, mobile terminal 20b then connects with the web server operated by Provider Y. As with mobile device 20a, and although not shown in FIG. 4, mobile device 20b could alternatively communicate with DNS 62 and with the Provider Y web server via a proxy.

Only two wireless networks and two mobile terminals are shown in FIG. 4 so as not to obscure the example with unnecessary detail. However, it is understood that additional mobile terminals would be operating within these two networks. The mobile terminals could be subscribers of network 40 or network 60, or merely roaming within one of these networks. Similarly, other wireless networks could be shown; these other networks could operate in the same geographic region as network 40 or network 60, could operate in regions that partially overlap the regions of network 40 and network 60, or could operate in different regions. Although each operator is free to determine which actual domain name (and thus which IP address) is mapped to a generic service name, multiple operators are not prevented from mapping the same generic service name to the same actual domain name.

Figure 1:
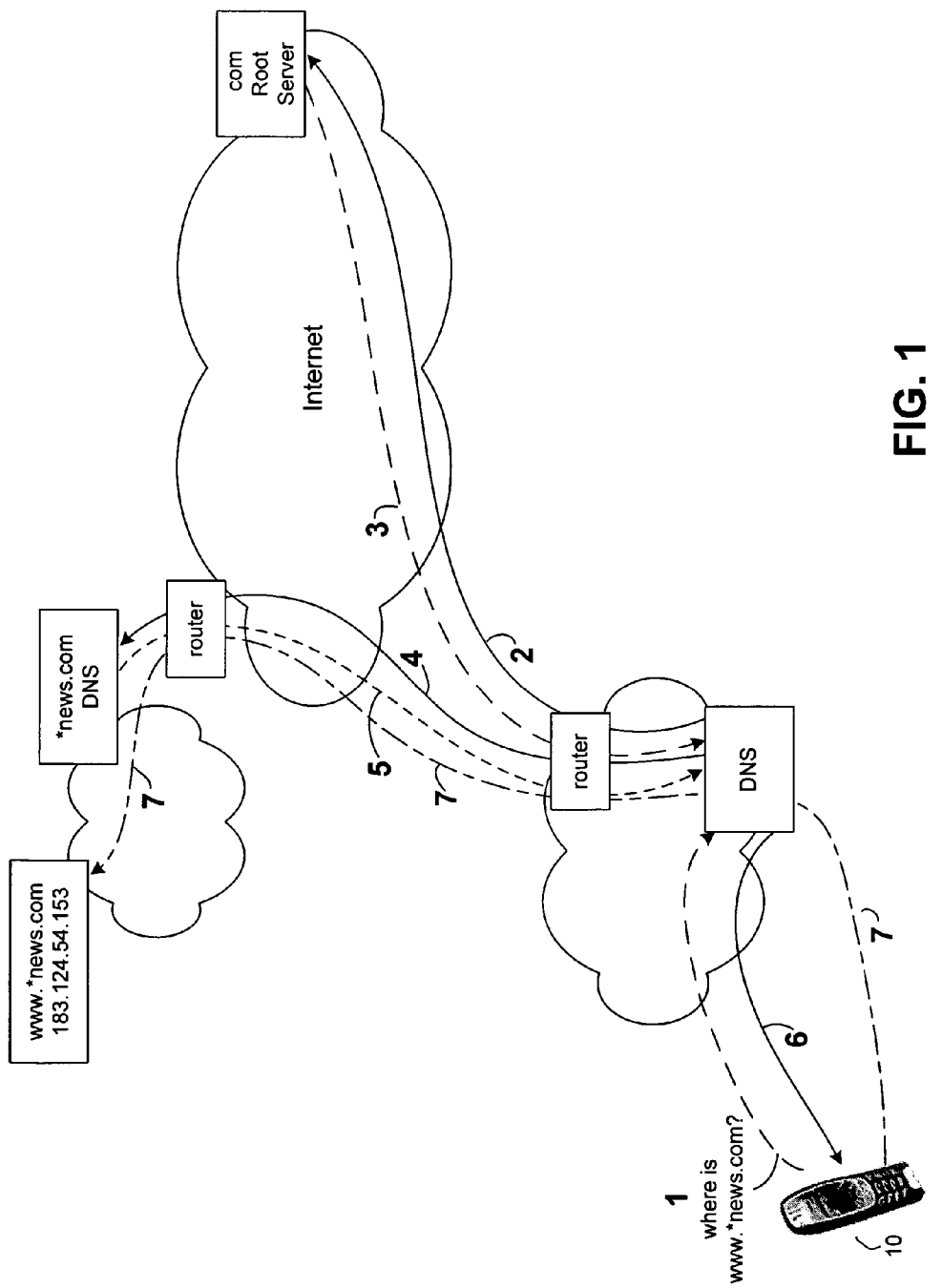
FIG. 1 is a block diagram of one existing method by which a mobile device accesses Internet information resources.

Notably, recognition of generic service names by DNS 42 and DNS 62 does not prevent mobile terminals 20a and 20b from accessing other sources of news (or other) information available on the Internet. As previously indicated, "www.*localnews.mobi" is treated by wireless network 40 and wireless network 60 as a generic service name, and thus mapped to a provider of each operator's choosing. However, other conventional domain names and/or other URIs are routed in a conventional manner. For example, a user of mobile terminal 20a may have previously determined that he or she prefers the information provided by Provider Y, and could specifically transmit the URL "www.#news.com". Upon receiving this request, Operator A DNS 42 could provide the IP address for "www.#news.com" (if that IP address was already cached by DNS 42), could obtain the IP address as set forth in FIG. 1, or could instruct mobile terminal 20a (or a proxy) to request the IP address directly from a DNS of domain "#news.com". The user of mobile terminal 20a might instead prefer the news provided by some other company not used by Operator A or Operator B (e.g., "www.!news.com"), and specifically submit that URL to DNS 42.

In at least one embodiment, Operator A and Operator B, as well as operators of other wireless networks, share a generic service name such as "operator.mobi". In other embodiments, specific generic service names point to the home operator portal and to a visited operator portal. For example, "home.operator.mobi" (or "homeoperator.mobi") points to a home operator portal and "local.operator.mobi" (or "localoperator.mobi") points to a visited operator's portal. Variations (e.g., "myoperator.mobi" and "thisoperator.mobi") could also be used. The generic service name "localservices.homeoperator.mobi" could point to localized services offered by the home operator and the generic service name "localservices.localoperator.mobi" could point to localized services offered by the visited operator. In other embodiments, a generic service name such as "operator.mobi" is used as a basis for generic service names such as "localnews.operator.mobi", "weather.operator.mobi", etc.

In at least some embodiments, upper level generic service names include one or more hierarchically arranged lower levels of generic service names. This tree of generic service names is further used to create a generic directory of information resources that can be accessed in a consistent manner in different wireless networks. In one embodiment, for example, the upper level generic service name "news.mobi" contains sub-levels of generic service services names "world.news.mobi", "money.news.mobi", "sports.news.mobi", etc. Under the generic service name "world.news.mobi" are additional sub-levels of generic service names for "usa.world.news.mobi", "europe.world.news.mobi" and "asia.world.news.mobi". Each of these sub-levels (as well as other upper level generic service names and their sub-levels) could have additional levels of generic service names. Each generic service name at every level is mapped to a default Internet resource. In at least one embodiment, each wireless network is free to override a default and re-map generic service names at one or more levels to non-default resources. If a user selects a generic service name for which a particular wireless network has not mapped a non-default resource, the generic service name is resolved in a conventional manner (e.g., as in FIG. 1) so as to allow access to the default resource. Although the entire tree for generic service names can be extensive, a mobile terminal is not required to store the entire tree. Instead, and as described below, the mobile terminal retrieves sub-levels of generic service names as they are needed. In one embodiment, a user may edit the offered selection of generic service names within a specific layer by adding or deleting generic service names.

In some embodiments, one or more sub-levels of generic service names can also be defined in a <domain name>/<file name> format. For example, instead of having a service name "boston_ma.us.%worldnews.mobi" a format of %worldnews.mobi/us/boston_ma could be used.

Figure 5:
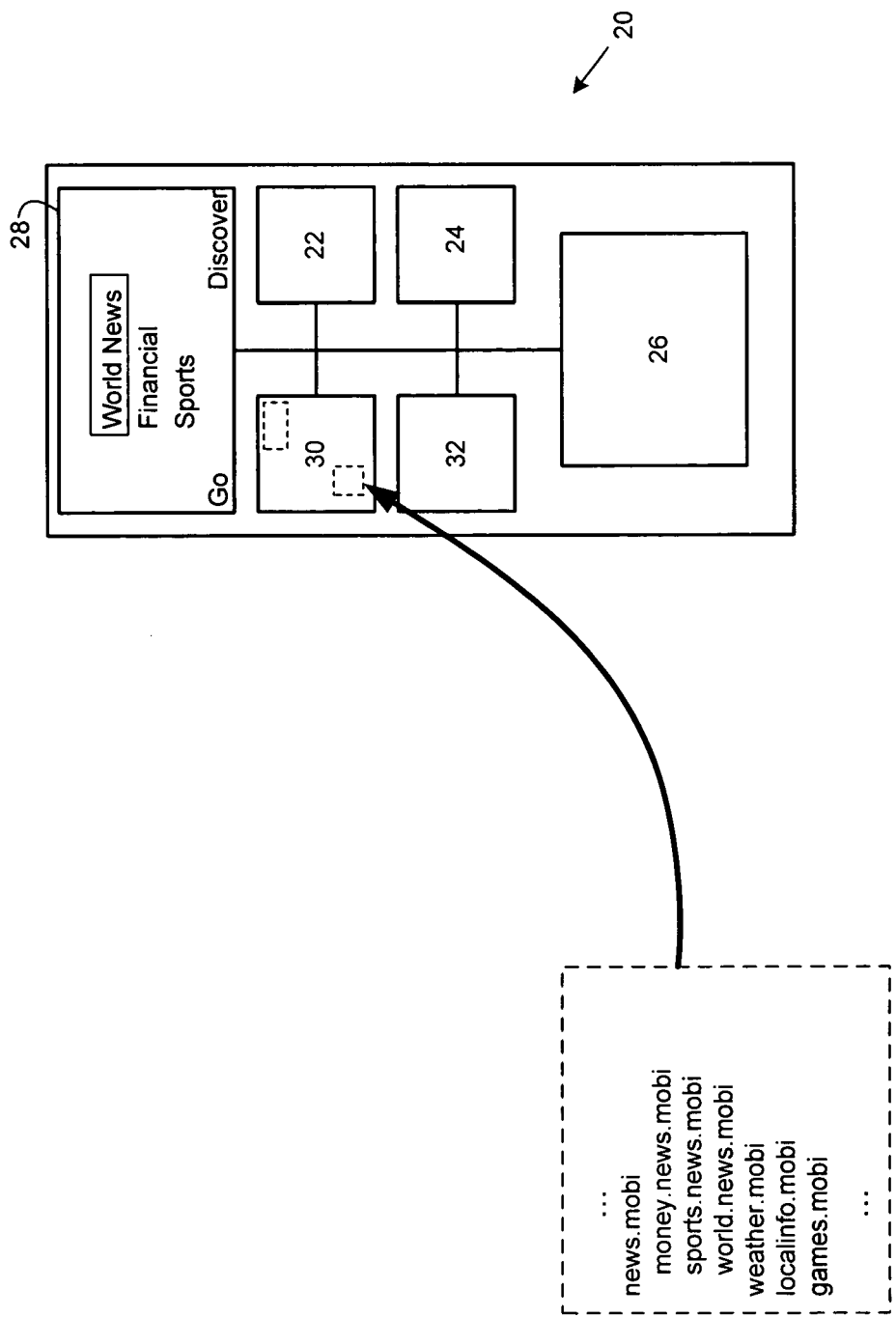
FIG. 5 is a further functional diagram of a mobile terminal according to at least one embodiment of the invention.
Figure 6:
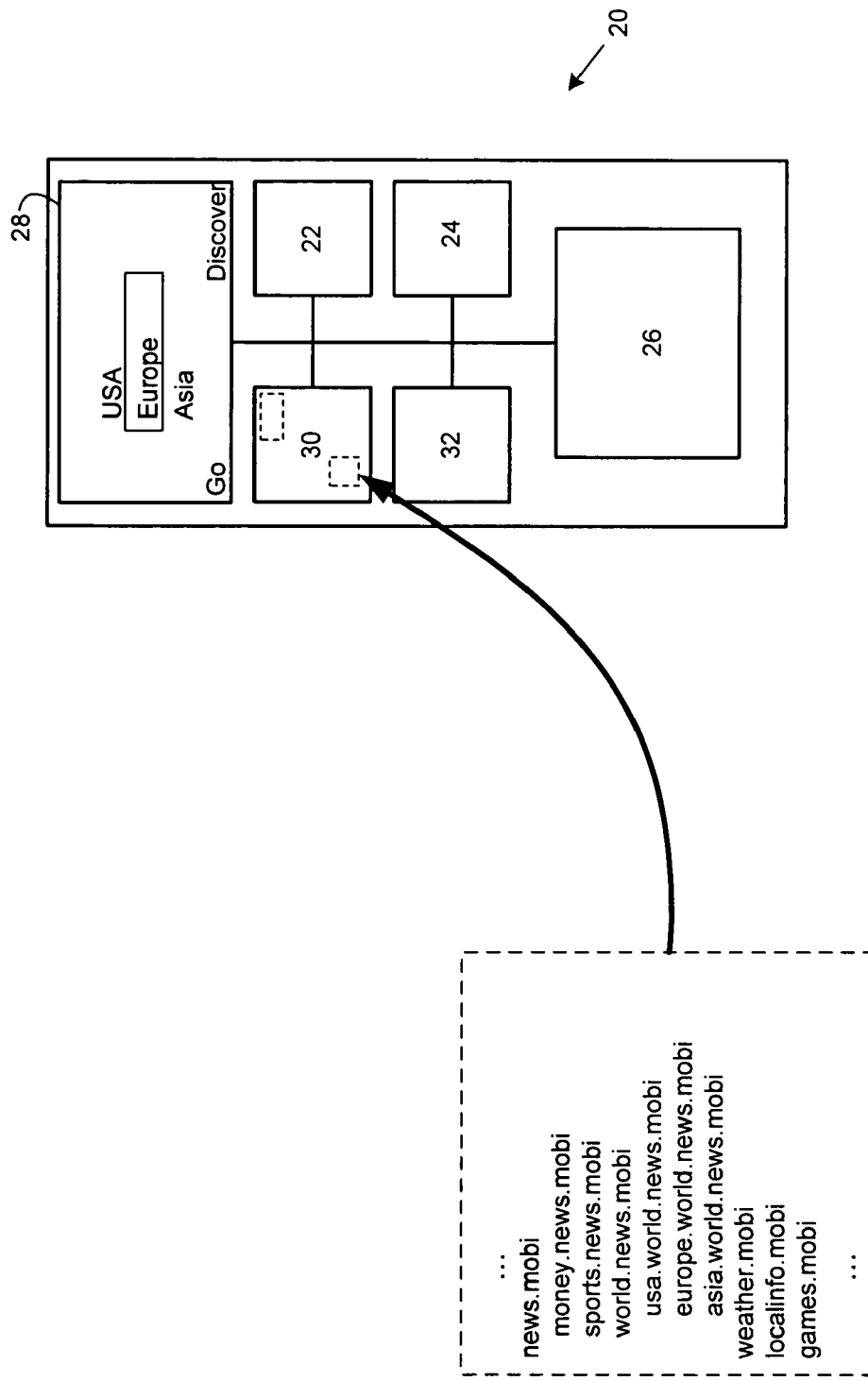
FIG. 6 is a further functional diagram of a mobile terminal according to at least one embodiment of the invention.

Returning to FIG. 3, a user is provided the opportunity, via display 28, to select a category corresponding to an upper level generic service name. In one embodiment, mobile terminal 20 retrieves a list of upper level generic service names (using a DNS "1s" list query) upon activation or otherwise commencing communication with a wireless network. These upper level names are then cached and built into a temporary service index within a terminal. A corresponding file structure can also be implemented in network-based servers if a hierarchical name structure is used for a related set of services. Upon selecting a generic service name (by, e.g., selecting a corresponding category on the display), browser software 34 of mobile terminal 20 transmits another "1s" list query to DNS 42 of wireless network 40. In response, DNS 42 returns service name sub-levels as a list of sub-domains registered for a selected upper level domain. In this case, and as shown in FIG. 5, the upper level generic service name ("news.mobi") comprises the sub-levels "money.news.mobi", "sports.news.mobi" and "world.news.mobi". Mobile terminal 20 then provides the user, via display 28, with the opportunity to select a category corresponding to one of these generic service name sub-levels. The procedure can be iterated to reach sub-levels of other upper level generic service names or further sub-levels of a selected sub-level. For example, upon selecting "world news" on display 28, mobile terminal 20 transmits a list query for "world.news.mobi". In response, DNS 42 returns a list of lower level generic service names: "usa.world.news.mobi", "europe.world.news.mobi" and "asia.world.news.mobi". In response to receiving these sub-level names, and as shown in FIG. 6, browser 34 displays subcategories "USA," "Europe" and "Asia" on display 28 of mobile terminal 20. There may be additional sub-levels for some, all or none of these categories. In the example, USA ("usa.world.news.mobi") and Asia ("asia.world.news.mobi") have no lower sub-levels, and "Europe" ("europe.world.news.mobi") has sub-levels for individual countries (e.g., "finland.europe.world.news.mobi", "spain.europe.world.news.mobi", etc.). Upon selecting "Europe," these additional sub-levels would be retrieved and corresponding categories (e.g., "Finland," "Spain," etc.) displayed.

In at least one embodiment, mobile terminal 20 includes at least two separate functions for selecting a generic service name (or a category corresponding thereto). As seen in FIGS. 5 and 6, one command ("Discover") instructs mobile terminal 20 expand the category into the next lower level of categories. Another command ("Go") instructs mobile terminal 20 to browse the highlighted category by accessing the corresponding Internet information resource.

Figure 7:
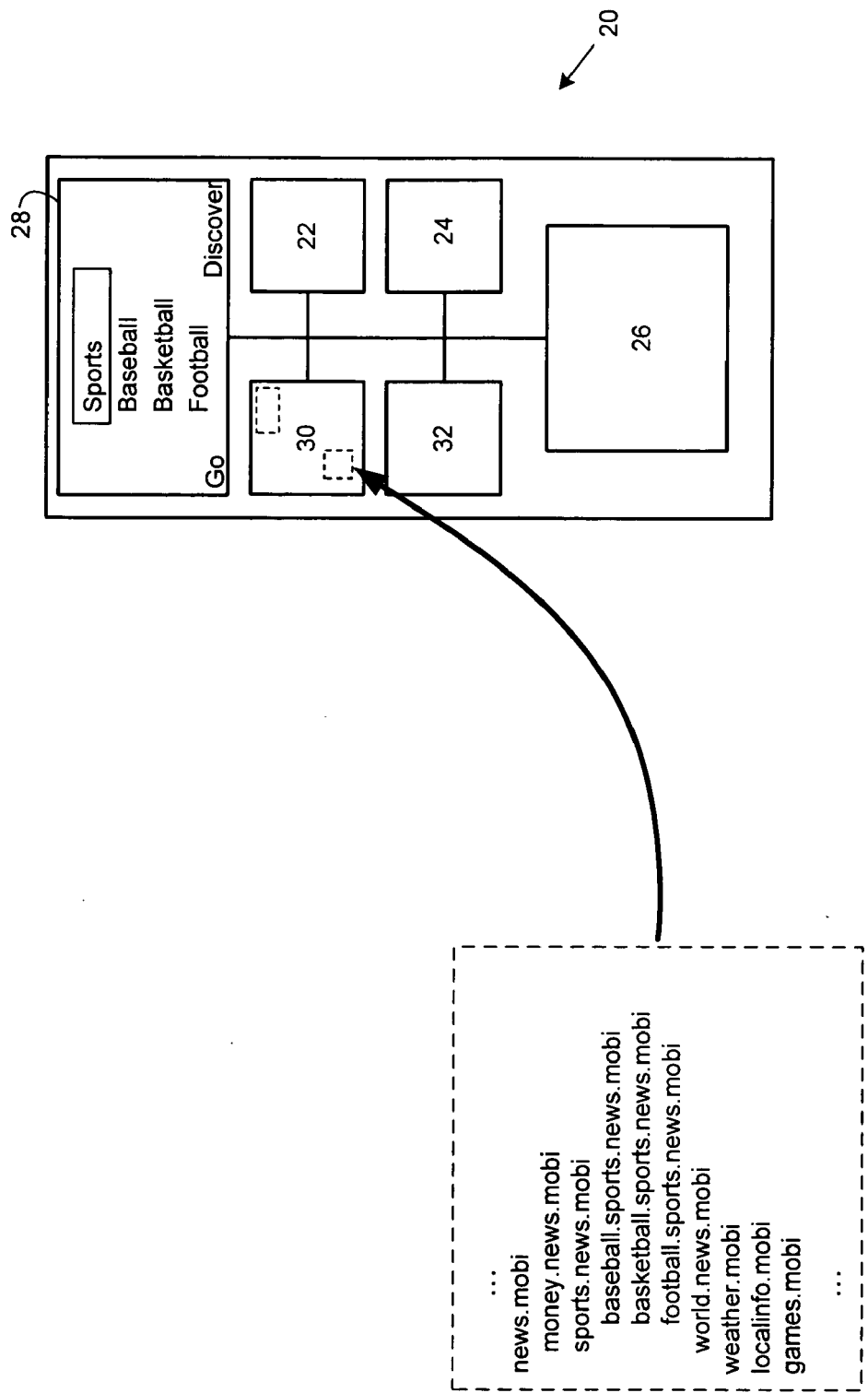
FIG. 7 is a further functional diagram of a mobile terminal according to at least one embodiment of the invention.
Figure 8:
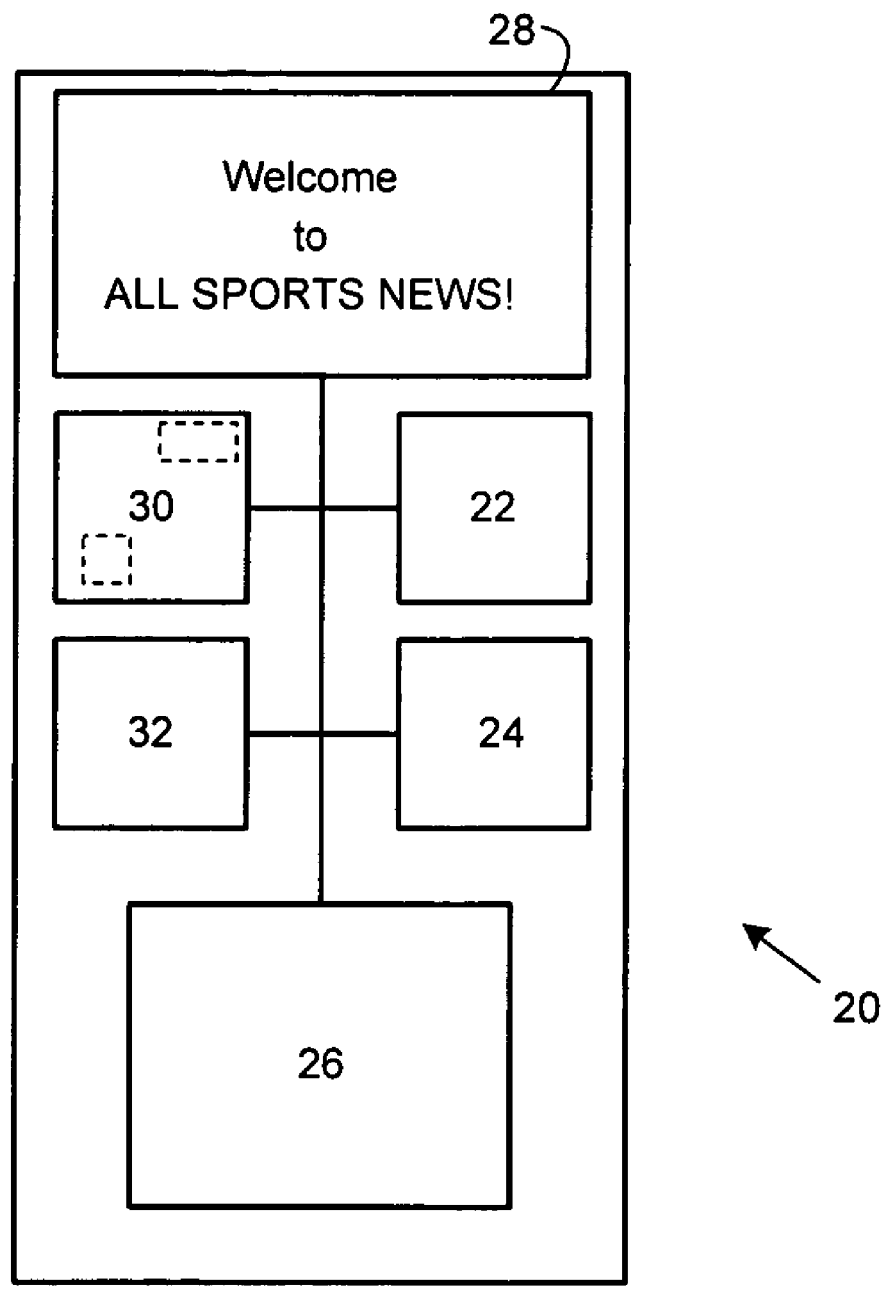
FIG. 8 is a drawing of a mobile terminal display according to at least one embodiment of the invention.

In at least one embodiment, certain generic service names (at both upper and lower levels) are mapped to Internet information resources and have further sub-levels. FIGS. 7 and 8 illustrate this aspect. Upon selecting "sports" (sports.news.mobi) in display 28 with a "Discover" command (FIG. 5), mobile terminal 20 queries DNS 42 for a list of any available sub-levels, as previously described. In response, and as shown in FIG. 7, DNS 42 provides an additional level of generic service name sub-levels: "baseball.sports.news.mobi", "basketball.sports.news.mobi" and "football.sports.news.mobi": Mobile terminal 20 then provides the user with the opportunity to select "sports," "baseball," "basketball" or "football." Upon selecting "sports" with the "Go" command, mobile terminal 20 does not resubmit a list query, and instead transmits the generic service name "www.sports.news.mobi" to DNS 42 in order to obtain an IP address of an Internet resource. In response, and as shown in FIG. 8, mobile terminal 20 is automatically connected to an Internet information resource.

In other embodiments, separate "Go" and "Discover" commands are not provided. Instead, browser 34 assumes a second selection of "sports" represents the user's desire to access the corresponding Internet resource. This could be implemented in various manners. In one embodiment, the browser software operating on mobile terminal 20 stores the time at which it transmitted the last query for sub-levels of "sports.news.mobi" and does not transmit another such query until a preset time expires.

In some preferred embodiments of the invention, and as shown in FIGS. 3, 5, 6, 7, 10, 10A and 11, generic service names are invisible to the mobile terminal user. Instead, an application operating upon the mobile terminal (and using the naming structure described) displays an information category name or other descriptive material regarding information resource(s) accessible via corresponding (and hidden) generic service name(s). In some embodiments, the displayed material can be (or include) an icon or other graphic.

In still other embodiments, generic service name sub-levels are provided to a mobile terminal in other manners. In one such embodiment, a list of sub-levels is stored in a Naming Authority Pointer (NAPTR) record. For each domain, the domain naming system database allows storage of extra information in specific records such as the NAPTR record. The relevant sub-domains for each domain are stored in these records. In this manner, and instead of performing a list search, a mobile terminal or other client can retrieve all sub-levels by retrieving the NAPTR record in which the list of sub-levels is contained. The mobile terminal could then periodically update the retrieved NAPTR records with a new query, potentially reducing the load on the wireless link and the mobile terminal. A standard WAP or WEB directory can then be automatically generated based on the DNS service tree stored in the NAPTR record for a generic service name. In other embodiments, other standard domain naming system commands (such as are used for, e.g., iterative zone transfer) could be used to retrieve all levels of generic service names at once.

Figure 9:
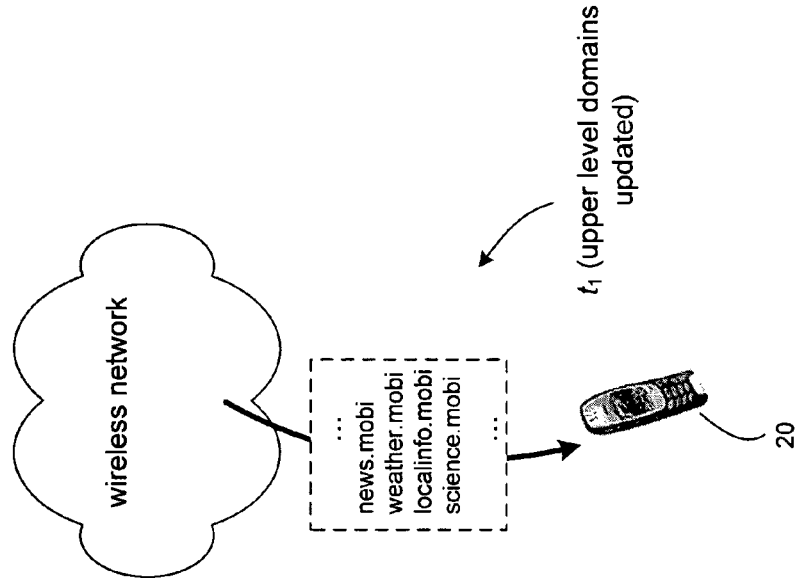
FIG. 9 is a block diagram showing update of generic service names.
Figure 9:
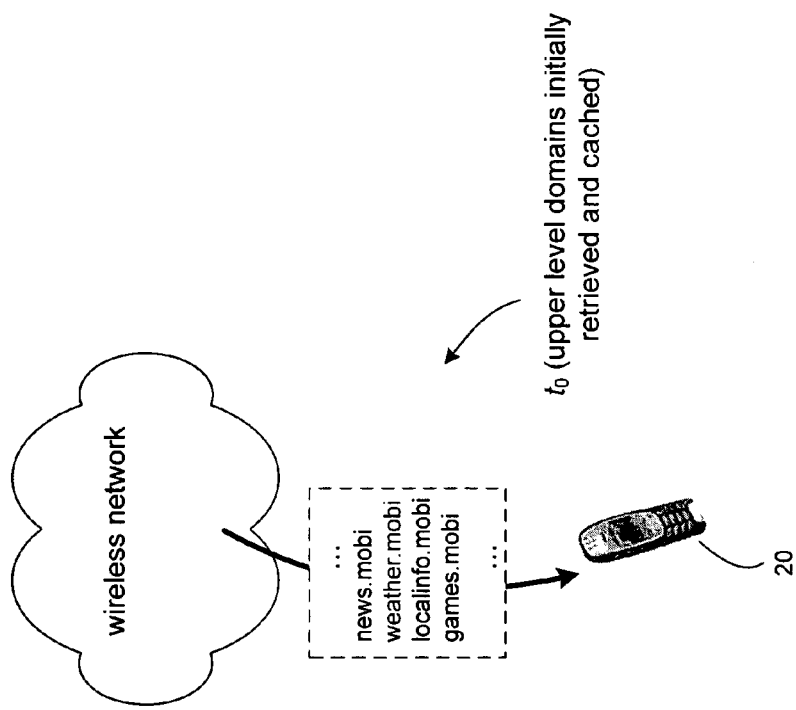

In at least one embodiment, and as shown in FIG. 9, the highest levels of the generic service name structure are updated automatically by a wireless network with which a mobile device is in communication. Upon initial activation within (or roaming into) a wireless network, the highest level menu structure is downloaded into the mobile terminal. In some variations of this embodiment, the user can configure the terminal to allow or not allow such automatic download. The highest level generic service name structure is then periodically, or on user request, updated by the wireless network and cached by the mobile terminal. In at least one embodiment, this update occurs during periods in which a data connection between a mobile terminal and the network is idle. The update system could further be optimized such that no updating occurs when network transmission traffic is at a predetermined percentage of maximum capacity. Lower level generic service names under an upper level recently visited by the user can be updated (automatically or on user request) in a similar manner.

Figure 10:
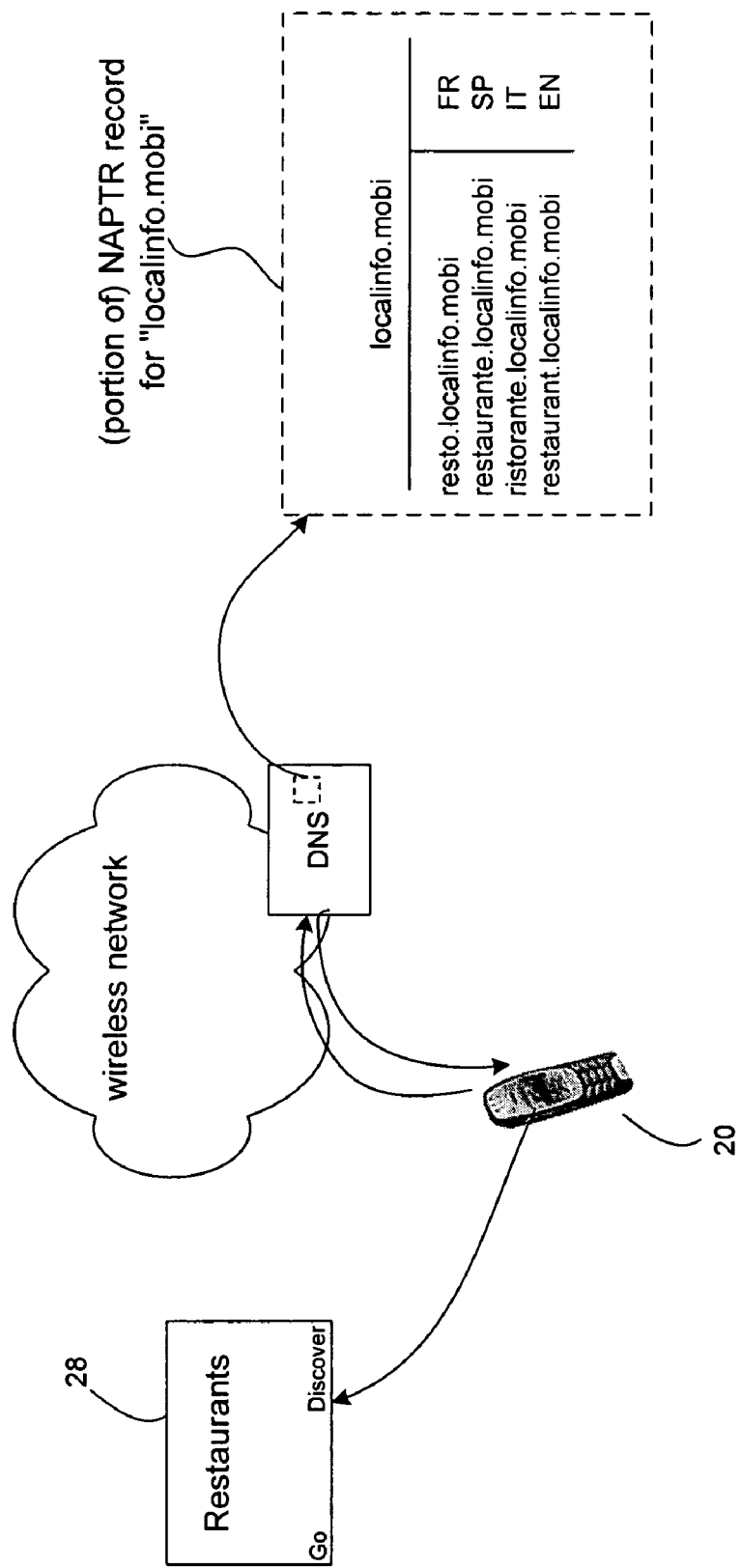
FIG. 10 is a block diagram showing storage of language information regarding generic service names.

In another embodiment, other existing features of the domain naming system structure facilitate services in multiple languages. In this embodiment, a mobile terminal presents information to a user in the user's preferred language. The preferred language is stored as a browser setting on the user's mobile terminal. If links to services in the preferred language are not available, related services in another language are offered. So as to facilitate management of service listings for multiple languages, each category (each generic service name level and/or sub-level belonging to a special class) is assigned a language field using standard DNS extensions. In one embodiment, language data for a generic service name is included in a NAPTR or text (TXT) record for a domain name set aside for use as a generic service name. Each generic service name is also given a name in an appropriate language. For example, and as shown in FIG. 10, the upper level service name "localinfo.mobi" includes the lower level generic service name "resto.localinfo.mobi" for accessing a French language information resource, "restaurante.localinfo.mobi" for accessing a Spanish language information resource, "ristorante.localinfo.mobi" for accessing an Italian language information resource, "restaurant.localinfo.mobi" for accessing an English language resource, etc. As shown schematically in FIG. 10, the NAPTR record for the "localinfo.mobi" domain, which contains these sub-levels, includes language identifiers. When a user having an English language preference expands the generic service name "localinfo.mobi", the user's mobile terminal requests only generic service names having an English language identifier. In response, the DNS provides "restaurant.localinfo.mobi", but not "restaurante.localinfo.mobi", "resto.localinfo.mobi" or "ristorante.localinfo.mobi". In other embodiments, all lower level generic service names are returned to the mobile terminal, but only the name corresponding to the preferred language is displayed. If no generic service names corresponding to the preferred language are available, all are returned and displayed.

For simplicity, FIG. 10 only shows one component of each generic service name sub-level in the language associated with that sub-level. In other embodiments, the generic service name tree is further organized by language at multiple levels (such that, e.g., "localinfo" would also be in an associated language). In some embodiments, language indication is in <domain name>/<file name> format, e.g. "localinfo.mobi/resto". If this type of naming is used, however, an Is query may not be available to update the service listings.

Figure 10A:
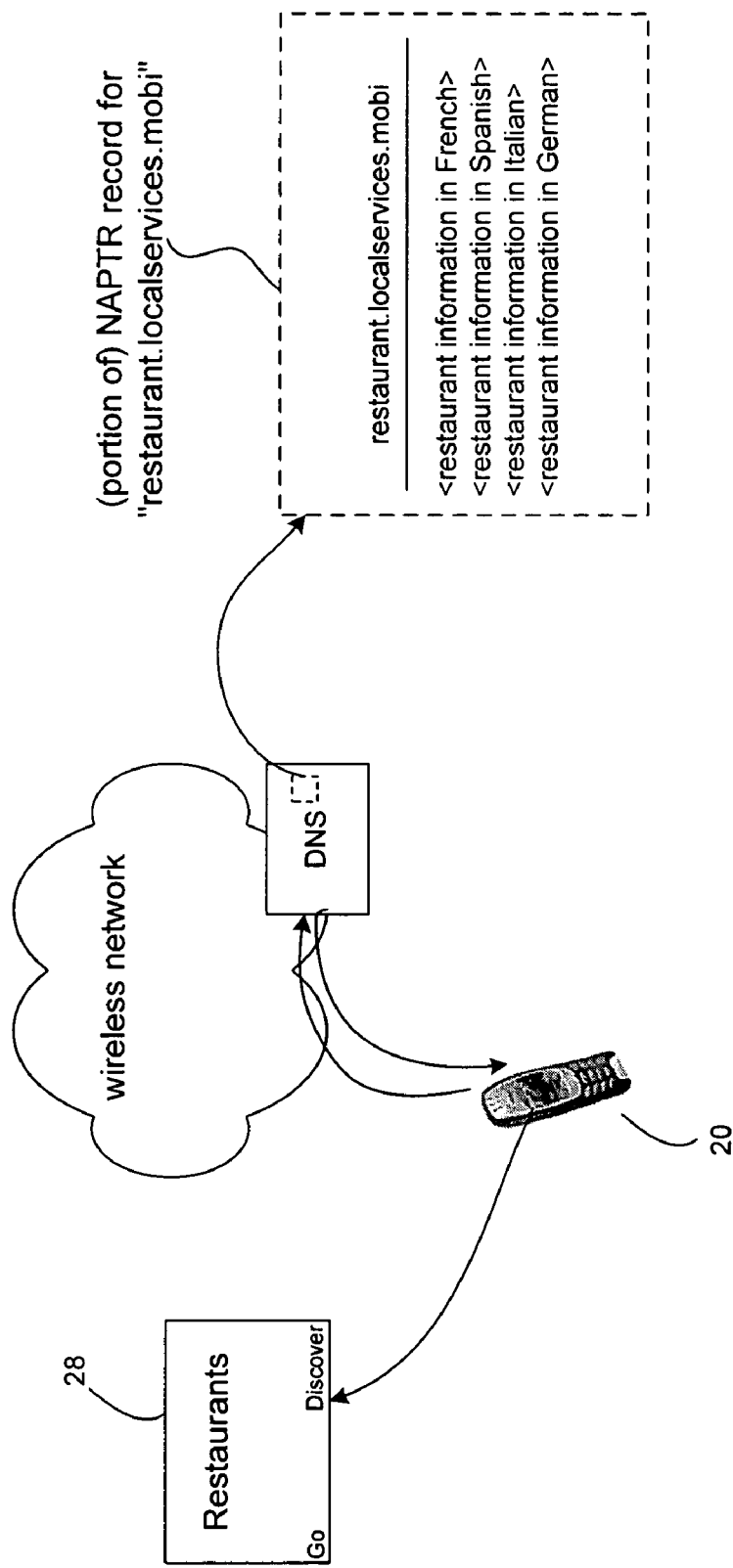
FIG. 10A is another block diagram showing storage of language information regarding generic service names.

In another embodiment shown in FIG. 10A, and instead of listing sub-domains with language attributes within a domain NAPTR record, a separate NAPTR record is attached to individual generic service names. FIG. 10A schematically shows an example of this embodiment for the generic service name "restaurant.localservices.mobi". The NAPTR record for "restaurant.localservices.mobi" shows equivalent services available in other languages: <restaurant information in French>, <restaurant information in Spanish>, <restaurant information in Italian> and <restaurant information in German>. As used in FIG. 10A, "<restaurant information in _>" represents a resource in the identified language. That resource may be another generic service name or may be an actual domain name. When a user expands "restaurant.localservices.mobi" (by, e.g., selecting "Discover" in display 28 while "Restaurants" is displayed), the terminal retrieves the resource names for the service in alternative languages. These alternate language services (or corresponding titles, icons, etc. supplied by the browser or other application) are displayed to the user. In some versions of this embodiment, the equivalent service names in the NAPTR record for "restaurant.localservices.mobi" also contain separate language identifiers (which may be a specific portion of the service names). The language identifier is then be compared against a preferred language setting in mobile terminal 20 so that only resource names for services in a desired language are retrieved and/or displayed.

Figure 11:
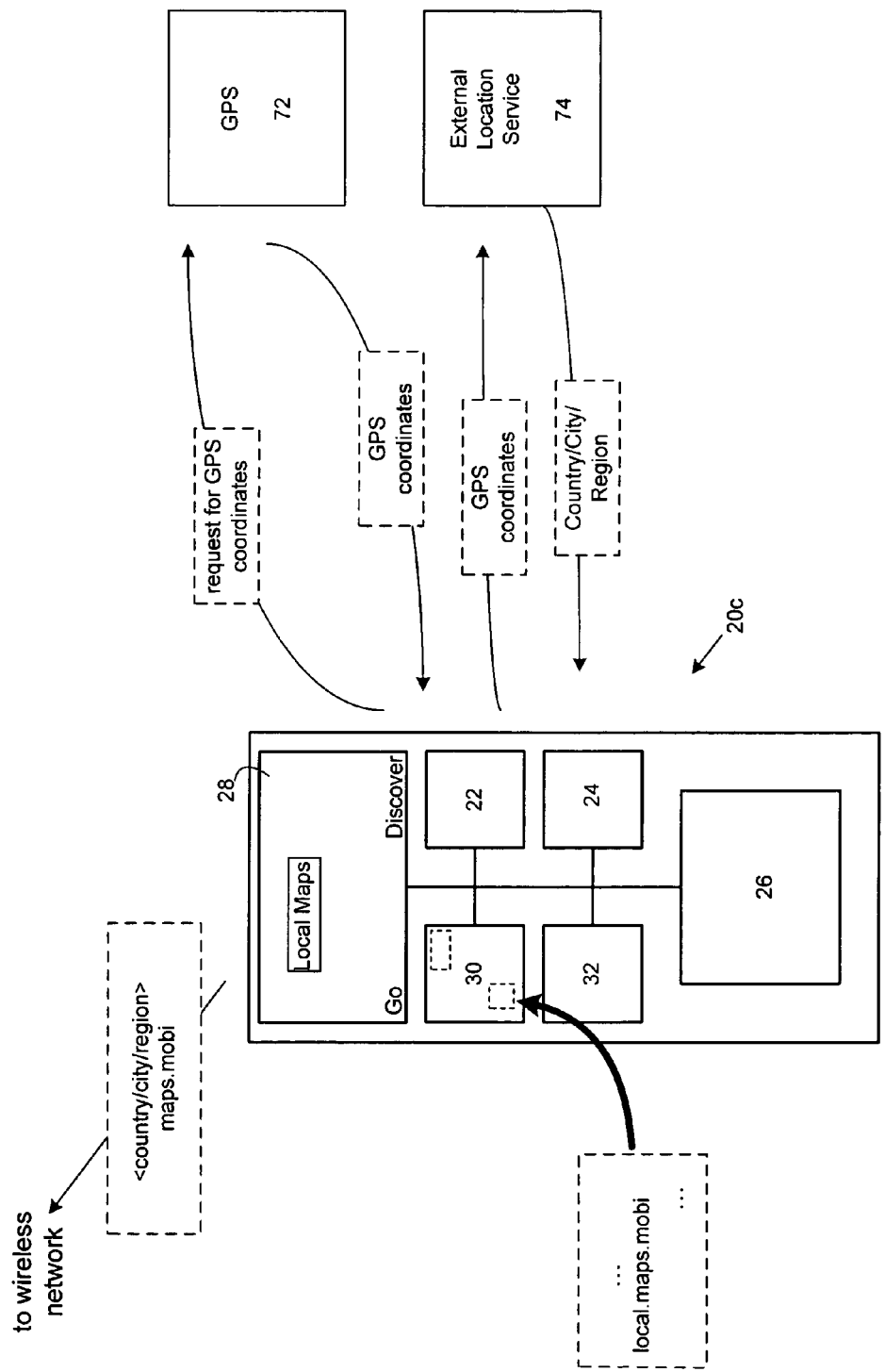
FIG. 11 is a further functional diagram of a mobile terminal according to at least one embodiment of the invention.

FIG. 11 illustrates another embodiment of the invention. In this embodiment, mobile terminal 20c determines its location and automatically completes a portion of a generic service name. As shown in FIG. 11, the user first selects "localmaps.mobi", a generic service name for an information resource having maps of an area in which mobile terminal 20c is currently located. Similar generic service names could include "localattractions.mobi" for local tourist information, "localmedical.mobi" for local medical services, etc. Mobile terminal 20c then determines its location. In at least one embodiment, mobile terminal 20c is in communication with a Global Positioning System (GPS) satellite receiver 72, and is able to determine its longitude and latitude base on GPS signals. In one embodiment, mobile terminal 20c includes an integral GPS receiver.

After determining its longitude and latitude, mobile terminal 20c queries an external location service 74 to map those GPS coordinates to a location name (e.g., country, city, etc.). In one embodiment, external location service 74 is accessed via the wireless network with which the mobile terminal is communicating, but not operated by that wireless network. After receiving a response from the external location mapping service, mobile terminal 20c rewrites "localmaps.mobi" to "<location> maps.mobi", where <location> represents the location information returned by the external mapping service. The rewritten generic service name is then transmitted to the wireless network. As previously indicated, different wireless network operators may provide different actual domain names for different resources in response to receiving this generic service name.

Figure 12:
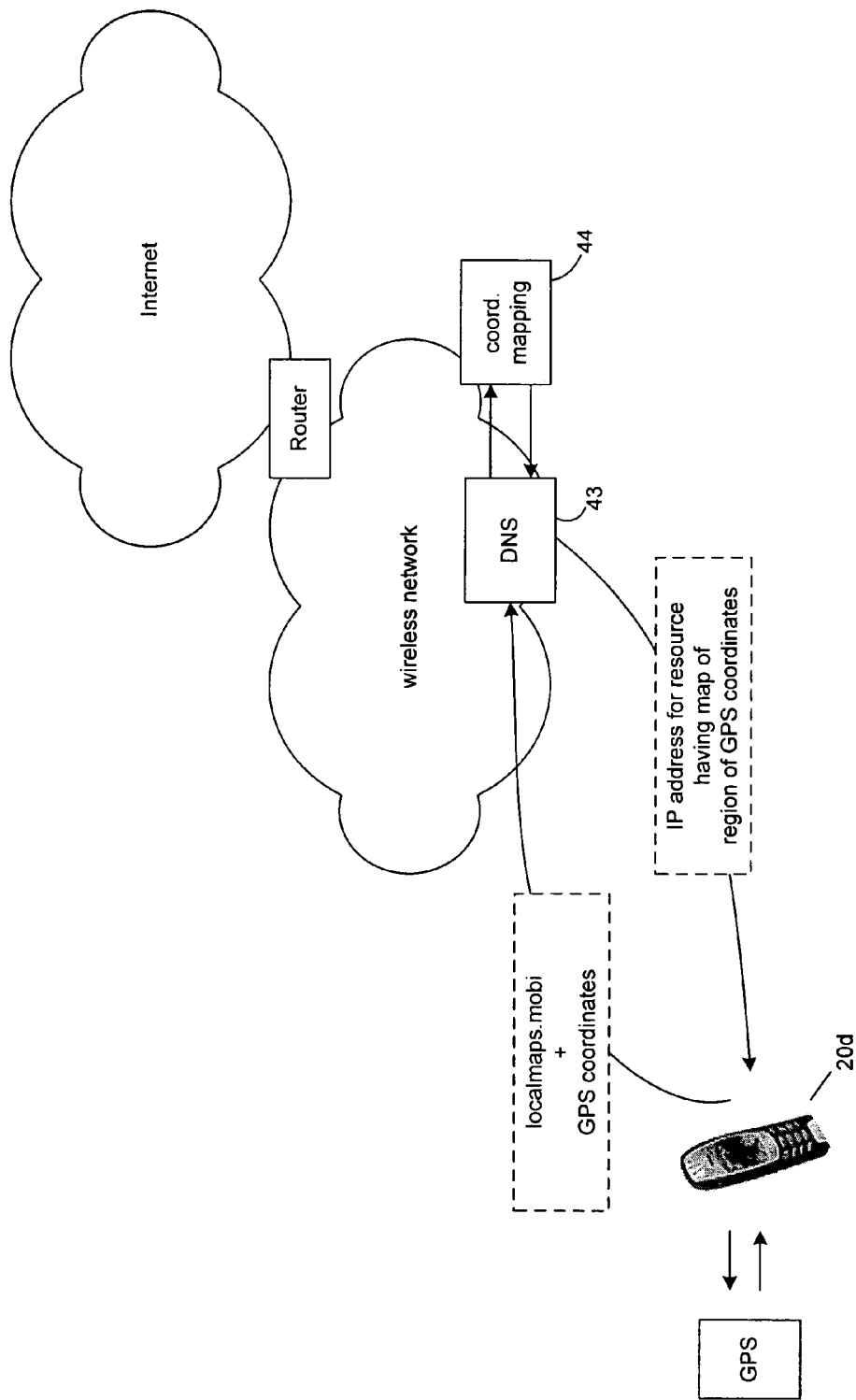
FIG. 12 is a block diagram showing transmission of location information according to another embodiment of the invention.

In another embodiment, some portions of the localization of a mobile terminal are performed by an extended DNS operated by the wireless operator. As shown in FIG. 12, mobile terminal 20d transmits, in addition to the generic service name "localmaps.mobi", position information obtained from a GPS module. In response, extended DNS 43 queries a coordinate mapping system 44 to determine the country, city and/or other regional location of mobile terminal 20d. Extended DNS 43 could be implemented as an extension to server software for DNS 43, or as a separate component to process the localization information before querying DNS 43. Mapping system 44 may be a separate software application operating upon extended DNS 43 or upon another computer in communication with extended DNS 43. Coordinate mapping system 44 returns the location information for the submitted location data (e.g., New York City, USA) to extended DNS 43. Extended DNS 43 then consults a lookup table and returns a service provider name, e.g., "ny.***maps.com" (which is converted to an IP address) or an IP address for a service provider. Another operator may choose to map "localmaps.mobi" to a different resource (e.g., "new-york.mobilemaps.!!!maps.com").

Figure 13:
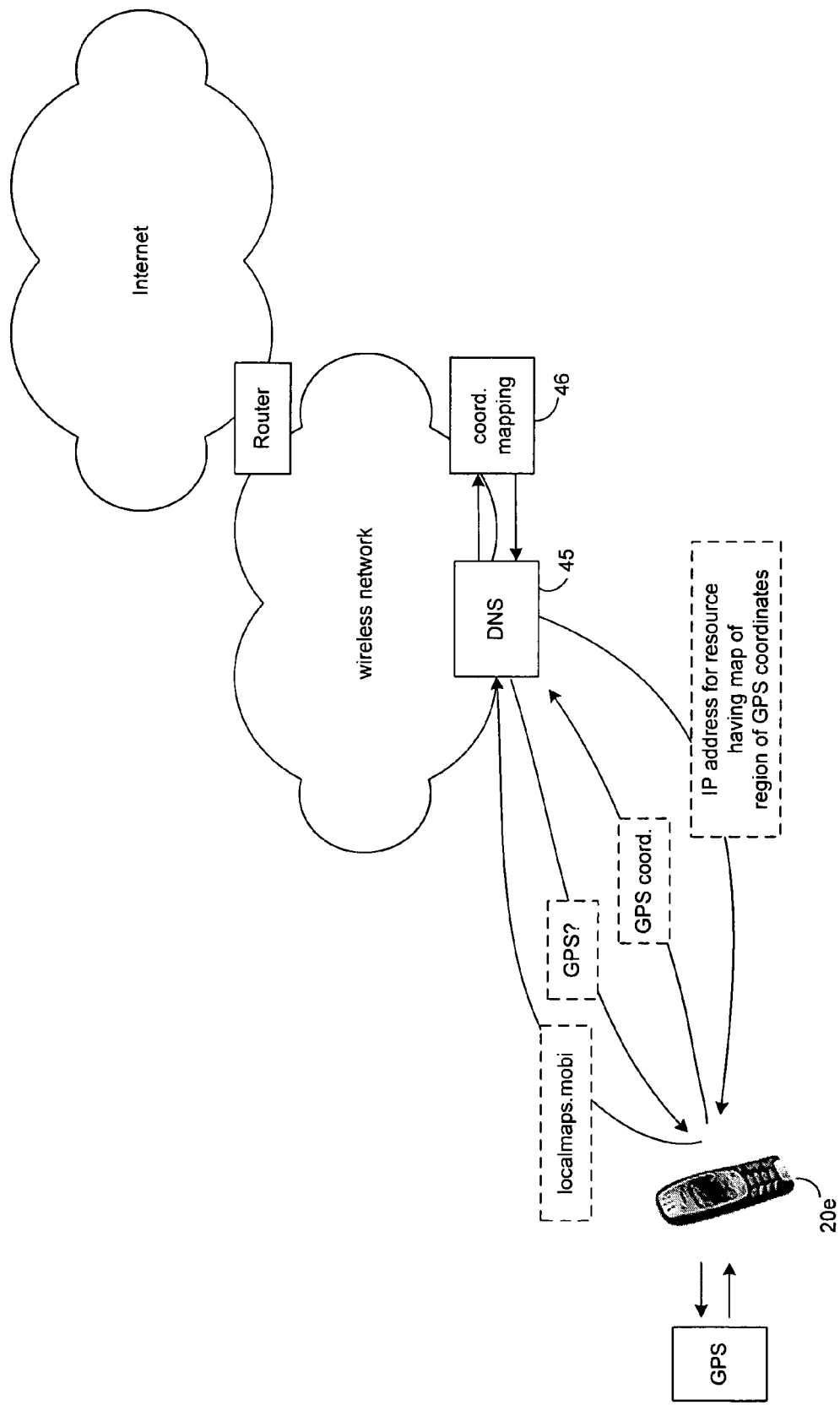
FIG. 13 is a block diagram showing transmission of location information according to another embodiment of the invention.

In another embodiment shown in FIG. 13, mobile terminal 20e transmits the generic service name "localmaps.mobi". If the position co-ordinates are not included in the request, extended DNS 45 queries mobile terminal 20e for position information. In response, mobile terminal 20e provides position information obtained from a GPS receiver. Extended DNS 45 then queries a coordinate mapping system 46 to determine the country, city and/or other regional location of mobile terminal 20e corresponding to the GPS information provided by mobile terminal 20e. As before, mapping system 46 may be a separate software application operating upon extended DNS 45 or upon another computer in communication with extended DNS 45. Coordinate mapping system 46 returns the location information for the submitted location data to extended DNS 45. Extended DNS 45 then consults a lookup table and returns an IP address for an Internet resource having the desired information.

In additional embodiments, a mobile terminal stores Cell ID and/or Area ID data corresponding to the cell with which the terminal last communicated, as well as a pre-defined set of Internet domain names. These names are reserved for localized services. Examples include "news.localinfo#.tld", "games.localinfo#.com", "service.something#.xyz". To illustrate these additional embodiments, these names are represented generically as "<localized name>". When the terminal requests information corresponding to one of these localized names, the Cell ID and/or Area ID are appended to the request: "<Cell ID><Area ID><localized name>" or "<Area ID><localized name>". Using, e.g., a local DNS or a local Web proxy, specific resources can be targeted to terminals requesting the same name from different locations, but to a higher degree of location granularity. When a user activates the mobile terminal, the terminal determines if the Cell ID or Area ID has changed since the last time the terminal was used. If changed, the terminal automatically checks to determine if new values for <localized name> are available for the new Cell ID/Area ID, and if so, downloads those new names. Checking for and downloading of new names could also be triggered by receipt of a new Cell ID or Area ID when the terminal moves to a new location while in use. Alternatively, and depending upon individual terminal configuration and/or capabilities, the names are only updated on request from the user.

Figure 14:
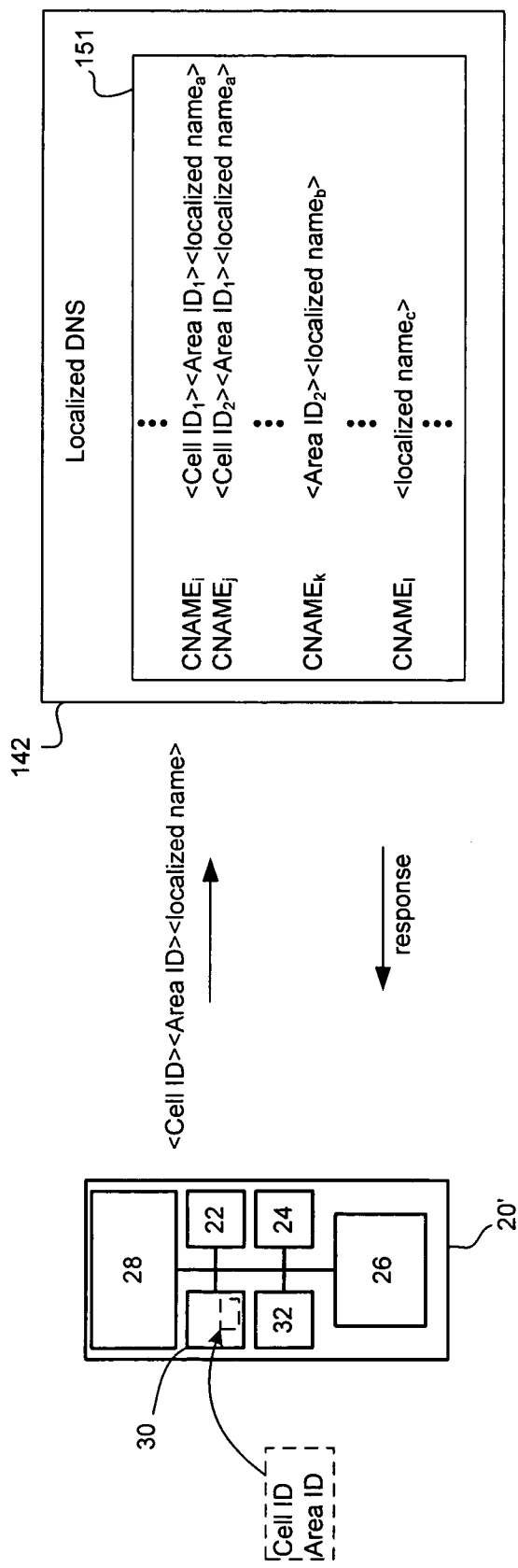
FIG. 14 is a drawing of a localized DNS according to one embodiment of the invention.

FIG. 14 illustrates one of these additional embodiments, implemented using a localized DNS 142, receiving a request from a mobile terminal 20'. In this embodiment, DNS 142 has an entry for different Cell IDs and/or Area IDs. Localized DNS 142 is specific to a particular wireless network operator; other operators maintain separate localized DNSs. As shown in FIG. 14, entries in lookup table 151 are in the form "<CellID><AreaID><localized name>", "<AreaID><localized name>" or simply "<localized name>". "CNAME" in lookup table 151 is, e.g. a canonical name for an Internet information resource. If a particular localized service reserved name (<localized name$_a$>) is directed an Internet resource based on Cell ID of the incoming request, there will be separate entries in lookup table 151 for different Cell IDs (Cell ID$_1$, Cell ID$_2$, etc.). If a particular localized name (<localized name$_b$>) is not directed to separate Internet resources based on Cell ID but is directed based on Area ID, there will be separate entries in lookup table 151 based on Area ID (e.g., Area ID$_2$). If a particular localized name (<localized name$_c$>) is not directed to separate Internet resources based on Cell ID or Area ID, there may be a single entry in lookup table 151 simply for that localized name.

Localized DNS 142 can be implemented using a DNS proxy service front end configuration (not separately shown) or using a dedicated application (also not separately shown) as a front end for the mobile terminal clients. Upon receipt of a name request from a terminal, the front end checks the most significant part of the name request (<localized name>) to determine if this localized name is one having an entry in of localized DNS 142; if so, the front end routes the request to localized DNS 142. In alternate configurations, the front-end checks the least significant part of the name request from the mobile terminal (<Cell ID> and/or <Area ID>), recognizes name request as a localized request based on the presence of <Cell ID>and/or <Area ID>, and routes the name request to localized DNS 142. If there is no match for <localized name>, <Cell ID>or <Area ID>, the request is handled as a conventional name request (e.g., as in FIG. 1).

A request from a mobile terminal for <CellID><AreaID><localized name> will therefore return a resource corresponding to the smallest degree of granularity for which the wireless network operator assigns resources to a localized service request. The returned value from local DNS 142 to the mobile terminal will be a pointer to a resource assigned to the localized name requested by the terminal. This could be either a website pointer, and IP address, a URL or other resource identifier.

Figure 15:
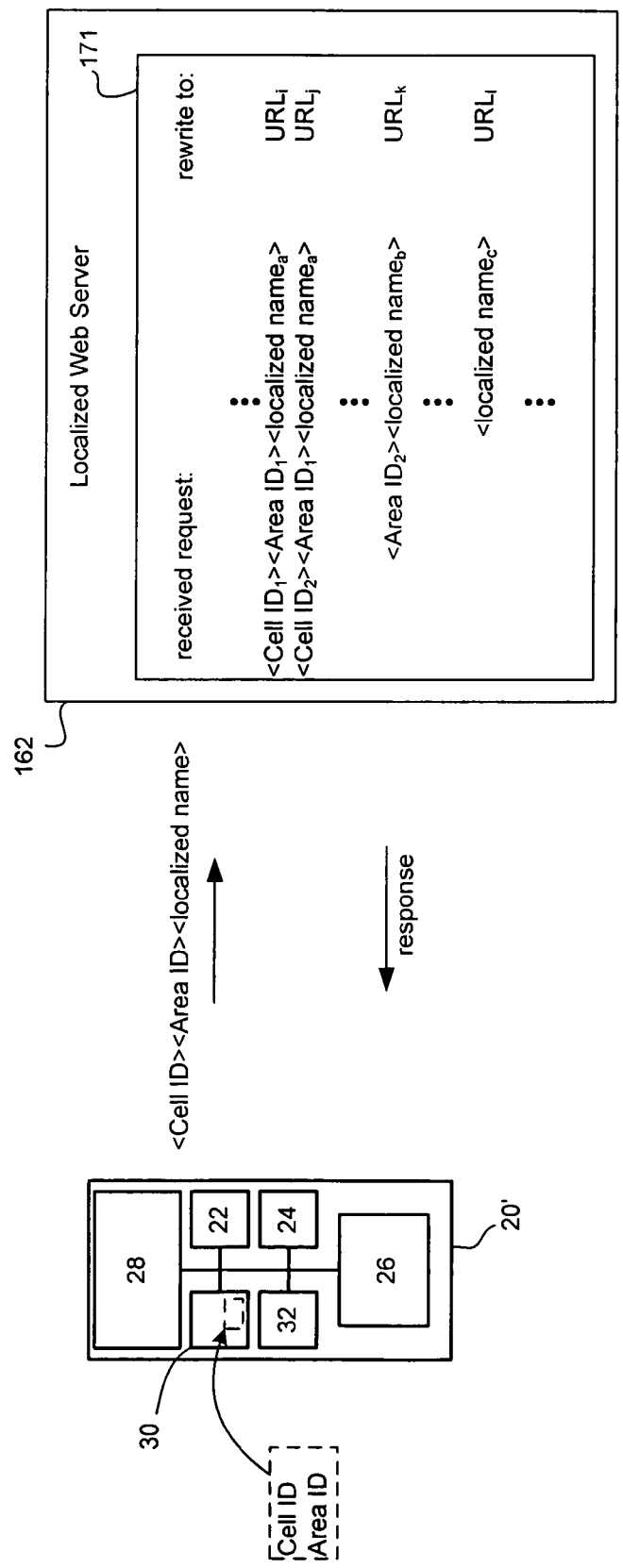
FIG. 15 is a drawing of a localized http server according to one embodiment of the invention.

FIG. 15 illustrates another of these additional embodiments implemented using a localized web server 162. Localized web server 162 is a conventional web server modified as described below, and receives name requests directed to <localized name>. Upon receipt of a <Cell ID><Area ID><localized name> request, web server 162 rewrites the received request to a specific resource using lookup table 171. Similar to localized DNS server 142, entries in lookup table 171 are in the form <CellID><AreaID><localized name>. If a particular localized service reserved name (<localized name$_a$>) is directed to an Internet resource based on Cell ID of the incoming request, there will be separate entries in lookup table 171 based on Cell ID (Cell ID$_1$, Cell ID$_2$, etc.), and received requests will be rewritten to the corresponding URL. If a particular localized name (<localized name$_b$>) is not directed to separate Internet resources based on Cell ID but is directed based on Area ID, there will be separate entries in lookup table 171 based on Area ID (e.g., Area ID$_2$). If a particular localized name (<localized name$_c$>) is not directed to separate Internet resources based on Cell ID or Area ID, there may be a single entry in lookup table 171 simply for that localized name.

Localized web server 162 can be implemented using a web server front end configuration (not separately shown) or using a dedicated application (also not separately shown) as a front end for mobile terminal clients. Upon receipt of a name request from a terminal, the front end checks the most significant part of the name request (<localized name>) to determine if this localized name is one having an entry in localized web server 162; if so, the front end routes the request to localized web server 162. In alternate configurations, the front end checks the least significant part of the name request from the mobile terminal (<Cell ID>and/or <Area ID>), recognizes name request as a localized request based on the presence of <Cell ID> and/or <Area ID>, and routes the name request to localized web server 162. If there is no match for <localized name>, <Cell ID>or <Area ID>, the request is handled as a conventional name request and, e.g., routed to separate server or to a separate partition of localized web server 162.

In alternate versions of the embodiments of FIGS. 14 and 15, language preferences could also be included in a name request. For example, language preferences stored by a mobile terminal could also be appended to the name request: "<Cell ID><Area ID><language ID><localized name>". The "<language ID>" component could identify more than one language. In these alternate versions of the embodiments of FIGS. 14 and 15, look up table 151 or 171 further assigns requests for Internet information resources based on the language ID. For example, "<Cell ID$_1$><Area ID$_1$><language ID$_1$><localized name>" would be assigned a first CNAME, while "<Cell ID$_1$><Area ID$_1$><language ID$_2$><localized name>" would be assigned another CNAME.

A DNS according to the above additional embodiments can be implemented with standard BIND (Berkeley Internet Name Daemon) software and require only the correct configuration for the selected implementation. The DNS Resource Record could also be used.

A mobile terminal 20' according to the above additional embodiments includes a dedicated DNS Resolver and/or client application which tracks current Cell ID and Area ID, language preferences, etc., and incorporates this data into a DNS request to be resolved by the localized DNS or the localized content server. The localized content server is based on Web or other Internet resources for which the wireless network operator is a local provider and/or for which the operator provides Internet addresses (or other links).

Although specific examples of carrying out the invention have been described, those skilled in the art will appreciate that there are numerous variations and permutations of the above-described systems and methods that are contained within the spirit and scope of the invention as set forth in the appended claims. For example, the user interfaces and screen layouts described are only examples; other user interfaces and screen layouts are within the scope of the invention. The generic service names and information categories used to describe the invention are only examples; other service names and information categories could also be used. Similarly, the tree structure used to describe the invention is only an example. Other structures are also within the scope of the invention. As but one example, "restaurant.sicily.italy.mobi" (location based directory) could be implemented together with or instead of "restaurant.localservices.mobi" (service based directory). The invention may also be implemented as a machine-readable medium having machine-executable instructions stored thereon such that, when the instructions are read and executed by an appropriate device (or devices), steps of a method according to the invention are performed. These and other modifications are within the scope of the invention as defined in the attached claims.

We claim:

1. A method comprising:
submitting a first generic service name to a first wireless network that stores a hierarchical generic service name tree containing a plurality of generic service names each associated with a default Internet information resource, wherein a first subset of said generic service names is mapped in said tree to a plurality of associated default Internet information resources by said first wireless network, and wherein a second subset of said service names is mapped in said tree to a plurality of non-default Internet information resources by said first wireless network, thereby overriding said default associations for said second subset of service names within said first wireless network;
accessing, in response to said submission, a default Internet information resource mapped to the first generic service name by the first wireless network;
submitting the first generic service name to a second wireless network; and
accessing, in response to said submission to the second wireless network, a non-default Internet information resource mapped to the first generic service name by the second wireless network, the non-default Internet information resource being distinct from the default information resource mapped to the first generic service name by the first wireless network.

2. The method of claim 1, wherein:
submitting a first generic service name comprises appending location-specific data to the first generic service name.

3. The method of claim 2, wherein the location-specific data comprises at least one of a Cell ID or an Area ID.

4. The method of claim 2, wherein the location-specific data comprises a Cell ID and an Area ID.

5. The method of claim 2, wherein the first wireless network maps said first generic service name to a default Internet information resource based on the appended location-specific data, and wherein the second wireless network does not map said first generic service name to an Internet information resource based on the appended location-specific data.

6. The method of claim 1, further comprising:
said mobile terminal automatically receiving at least a portion of said tree upon entering a coverage area of, and commencing wireless communication with, the first wireless network.

7. The method of claim 6, further comprising:
said mobile terminal receiving an update of generic service names while in wireless communication with the first wireless network.

8. The method of claim 1, wherein:
the first and second generic service names are upper level generic service names in a generic service name tree, and
the generic service name tree comprises multiple hierarchically arranged lower levels of generic service names.

9. The method of claim 8, wherein:
each of a plurality of generic service names in the tree is associated with a default information resource,
displaying, upon selection of the at least one generic service name, a language-specific generic service name having an associated language matching a preferred language setting of the mobile terminal.

10. The method of claim 9, wherein:
a sub-subset of service names in the first subset is also in the second subset, and
each of multiple service names in the sub-subset is mapped to an information resource by the first wireless network distinct from the information resource mapped to the service name by the second wireless network.

11. The method of claim 1, wherein:
at least one generic service name has a plurality of corresponding language-specific generic service names, and
each of the language-specific generic service names has an associated language, and said method further comprising:
a communications interface configured to provide two-way communication via a wireless network between the apparatus and other locations;
an input device;
a processor; and
a memory, the memory having stored thereon machine-executable instructions which, when executed by the processor, cause the apparatus to perform the following:
storing a plurality of generic service names,
receiving a user selection of an information category corresponding to a first of the plurality of generic service names,
transmitting, to a first wireless network, a request for a sub-level of generic service names assigned to the information category,
receiving, from the first wireless network in response to the request, a list of generic services names of the sub-level,
displaying a plurality of said generic service names of the sub-level,
receiving a user selection of one of the sub-level generic service names,
transmitting the selected sub-level generic service name via wireless communication link with the first wireless network,
accessing, in response to transmission of the selected sub-level generic service name via the wireless communication link with the first wireless network, a first Internet information resource,
receiving a user selection of an information category corresponding to a second of the plurality of generic service names,
transmitting the second generic service name via the wireless communication link with the first wireless network,
accessing, in response to transmission of the second generic service name via the wireless communication link with the first wireless network, a second Internet information resource,
receiving a user reselection of an information category corresponding to the first or second of the plurality of generic service names, transmitting the generic service name corresponding to the reselected category via a wireless communication link with a second wireless network, accessing, in response to transmission of the corresponding generic service name, a third Internet information resource, the third Internet information resource being different from the first or second Internet information resources;

wherein the first and second generic service names are upper level generic service names in a generic service name tree that comprises multiple hierarchically arranged lower levels of generic service names;

each of a plurality of generic service names in the tree is associated with a default information resource, each generic service name in a first subset of the plurality is mapped by the first wireless network to a distinct non-default information resource, each generic service name in a second subset of the plurality is mapped by the second wireless network to a distinct non-default information resource, and the memory has stored thereon additional machine-executable instructions which, when executed by the processor, cause the apparatus to perform a method comprising:

transmitting a generic service name of the first subset to the first wireless network, accessing, in response to said transmission, the non-default information resource mapped to said first subset generic service name by the first wireless network, transmitting to the first wireless network a third generic service name not mapped by the first wireless network to a non-default information resource, and accessing the default information resource associated with the third generic service name.

12. The method of claim 11, wherein data identifying the associated language for each of the language-specific generic service names is stored in a Naming Authority Pointer (NAPTR) record.

13. The method of claim 1, wherein the first and second wireless network are in the same geographic area, and wherein the first, second and third Internet information resources are unrelated to location of the mobile terminal.

14. The method of claim 1, wherein:

the first and second wireless networks and at least one additional wireless network are members of a plurality of wireless networks, the first generic service name is included in a collection of generic service names, and each generic service name of the collection is mapped by at least one of the plurality of wireless networks to an Internet information resource distinct from a resource mapped to said generic service name by at least one of the remaining wireless networks of the plurality.

15. An apparatus, comprising:

each generic service name in a first subset of the plurality is mapped by the first wireless network to a distinct non-default information resource, and each generic service name in a second subset of the plurality is mapped by the second wireless network to a distinct non-default information resource, and further comprising:

submitting a generic service name of the first subset to the first wireless network;

accessing, in response to said submission, the non-default information resource mapped to said first subset generic service name by the first wireless network;

submitting to the first wireless network a third generic service name not mapped by the first wireless network to a non-default information resource; and accessing the default information resource associated with the third generic service name.

16. The apparatus of claim 15 wherein:

transmitting a first selected sub-level generic service name comprises appending location-specific data to the first selected sub-level generic service name, transmitting a second generic service name comprises appending location-specific data to the second generic service name, and transmitting one of the first selected sub-level generic service or second generic service names comprises appending location-specific data to said one of the first selected sub-level or second generic service names.

17. The apparatus of claim 16, wherein the location-specific data comprises at least one of a Cell ID or an Area ID.

18. The apparatus of claim 16 wherein the location-specific data comprises a Cell ID and an Area ID.

19. The apparatus of claim 15, wherein the memory has stored thereon additional machine-executable instructions which, when executed by the processor, cause the apparatus to perform the following:

receiving the stored plurality of generic service names from the first wireless network after commencing wireless communication with the first wireless network.

20. The apparatus of claim 19, wherein the memory has stored thereon additional machine-executable instructions which, when executed by the processor, cause the apparatus to perform the following:

receiving an update of the stored plurality of generic service names while in wireless communication with the first wireless network.

21. The apparatus of claim 15, wherein:

a sub-subset of service names in the first subset is also in the second subset, and each of multiple service names in the sub-subset is mapped to an information resource by the first wireless network distinct from the information resource mapped to the service name by the second wireless network.

22. The apparatus of claim 15, further comprising a display screen, and wherein:

at least one generic service name has a plurality of corresponding language-specific generic service names, each of the language-specific generic service names has an associated language, and the memory has stored thereon additional machine-executable instructions which, when executed by the processor, cause the apparatus to perform the following:

displaying, upon selection of an information category corresponding to the at least one generic service name, a language-specific generic service name having an associated language matching a preferred language setting stored in the memory.

23. The apparatus of claim 22, wherein the memory has stored thereon additional machine-executable instructions which, when executed by the processor, cause the apparatus to perform the following:

transmitting data identifying the preferred language setting, and receiving only language-specific generic service names having an associated language matching the preferred language setting.

24. The apparatus of claim 22, wherein the memory has stored thereon additional machine-executable instructions which, when executed by the processor, cause the apparatus to perform the following:
 transmitting data identifying the preferred language setting,
 receiving a set of language-specific generic service names comprising service names having an associated language matching the preferred language setting and service names having an associated language not matching the preferred language setting, and
 displaying information corresponding to the service names of the set having an associated language matching the preferred language setting without displaying information corresponding to the service names of the set having an associated language not matching the preferred language setting.

25. The apparatus of claim 15, further comprising a display screen, and wherein the memory has stored thereon additional machine-executable instructions which, when executed by the processor, cause the apparatus to perform the following:
 displaying on the display screen a plurality of information categories, each of the displayed information categories corresponding to one of the generic service names, and
 displaying on the display screen, subsequent to receiving a user selection of a displayed information category, an Internet information resource mapped by the first wireless network to the generic service name corresponding to the selected displayed category.

26. The apparatus of claim 15, wherein the memory has stored thereon additional machine-executable instructions which, when executed by the processor, cause the apparatus to perform the following:
 accessing, upon receipt of a user selection of a location-dependent information category, a source of Global Positioning System (GPS) coordinate data,
 retrieving from said GPS source coordinate data for the current location of the apparatus, and
 transmitting the retrieved coordinate data to the first wireless network with the generic service name corresponding to the selected location-dependent category.

27. The apparatus of claim 15, wherein the memory has stored thereon additional machine-executable instructions which, when executed by the processor, cause the apparatus to perform the following:
 accessing, upon receipt of a user selection of a location-dependent information category, a source of Global Positioning System (GPS) coordinate data,
 retrieving from said GPS source coordinate data for the current location of the apparatus,
 accessing a data source mapping the GPS coordinate data to a geographic area comprising at least one of a country, city, or town,
 rewriting a generic service name corresponding to the selected location-dependent category to include a description of the geographic area, and
 transmitting the rewritten generic service name to the first wireless network.

28. The apparatus of claim 15, wherein the memory has stored thereon additional machine-executable instructions which, when executed by the processor, cause the apparatus to perform the following:
 transmitting a generic service name to the first wireless network,
 receiving from the first wireless network a request for coordinate location data for the apparatus,
 accessing, upon receipt of the request, a source of Global Positioning System (GPS) coordinate data,
 retrieving from said GPS source coordinate data for the current location of the apparatus, and
 transmitting the retrieved coordinate data to the first wireless network.

29. A server comprising:
 a memory;
 a communications interface coupled to a wireless communication network; and
 a processor configured to perform the following:
  storing a first plurality of generic service names in a database in the memory, each generic service name in the first plurality being mapped to multiple distinct Internet information
  each generic service name in the first plurality is mapped to multiple Internet information resources based upon different combinations of the generic service name, values for a Cell ID and values for an Area ID,
  each generic service name in a third plurality is mapped to multiple Internet information resources based upon different combinations of the generic service name and values for an Area ID,
  the processor is configured to receive communications from mobile terminals via the communications interface, each communication containing a generic service name of the first, second or third plurality appended to a value for a Cell ID and a value for an Area ID,
  mobile terminals communicating a generic service name from the first plurality are directed to an Internet information resource based on the combination of the generic service name and the Cell ID and Area ID values in the communication, and
  the processor is further configured to provide, in response to each of the communications from mobile terminals containing a generic service name from the third plurality, direction to the resource mapped to the combination of the generic service name and Area ID value in the communication.

30. The server of claim 29, wherein:
 each of the generic service names of the first plurality is mapped to multiple distinct Internet information resources based on different combinations of the generic service name, language preferences and values for at least one of a Cell ID and an Area ID,
 the processor is configured to receive communications from mobile terminals containing a generic service name of the first plurality appended to a language preference and to a value for at least one of a Cell ID or an Area ID, and
 the processor is configured to provide, in response to each of the communications from mobile terminals containing a generic service name of the first plurality, direction to the resource mapped to the combination of the generic service name, language preference and Cell ID or Area ID value in the communication.

31. The server of claim 29, wherein the server is a localized DNS.

32. The server of claim 29, wherein the server is a localized web server.

33. The server of claim 29, wherein:
 resources based upon different combinations of the generic service name and values for at least one of a Cell ID and an Area ID, storing a second plurality of generic service names in a database in the memory, each generic service name in the second plurality being mapped to a single distinct Internet information resource without regard to a value for a Cell ID or an Area ID, receiving communications from mobile terminals via the communications interface, each communication containing a generic service name of the first or second plurality appended to a value for at least one of a Cell ID and an Area ID, providing, in response to each of the communications from mobile terminals containing a generic service name of the first plurality, direction to the resource mapped to the combination of the generic service name and Cell ID or Area ID value in the communication, providing, in response to each of the communications from mobile terminals containing a generic service name of the second plurality, direction to the resource mapped to the generic service name, detecting a discovery request in a communication received from a requesting mobile terminal, said discovery request accompanied by an identification of a category of information, and in response to detecting said discovery request, providing a multi-level hierarchical directory of generic service names to said requesting mobile terminal for display to a user.

34. A server comprising:

a memory;

a communications interface coupled to a wireless communication network; and a processor configured to perform the following:

storing a plurality of generic service names in a database in the memory, each of the generic service names being mapped to a plurality of alternate information resources in a plurality of different languages, wherein said alternate information resources provide a common type of service, and further wherein a generic service name mapped to a non-default information resource has overridden a generic service name mapped to a default information resource, receiving a request from a mobile terminal, via the communications interface, containing one of the plurality of generic service names and a language preference, consulting said database to identify an alternate information resource that is mapped to said one of the plurality of generic service names and that is in a language corresponding to said language preference, and providing, in response to said request, direction to said identified alternate information resource.

35. The server of claim 34, wherein said server is configured to automatically supply a portion of said plurality of generic service names to mobile terminals that enter into an area of wireless coverage of said server.

36. The server of claim 35, wherein said server is configured to automatically expand a selected generic service name in response to a user request.

37. A machine-readable medium storing machine-executable instructions for performing the following:

providing a user with an option of transmitting a discovery command requesting that a transmitted generic service name be resolved into a plurality of sub-level generic service names mapped to said transmitted generic service name by a wireless network receiving said discovery command;

providing a user with an option of transmitting a go command requesting that a transmitted generic service name be resolved into an Internet address by a wireless network receiving said go command;

submitting a first generic service name and a discovery command to a first wireless network and receiving in response a plurality of sub-level generic service names mapped to said first generic service name by said first wireless network;

submitting a second generic service name and a go command to said first wireless network and receiving in response a first Internet address mapped to said second generic service name by said first wireless network;

submitting said second generic service name and a go command to a second wireless network and receiving in response a second Internet address mapped to said second generic service name by said second wireless network, said first and second Internet addresses being different from one another;

wherein said plurality of sub-level generic service names includes a first subset of generic service names common to a plurality of wireless networks, and a second subset of non-default generic service names overridden by said first wireless network to override a default mapping of service names in said second subset.

38. The machine-readable medium of claim 37, wherein:

submitting a first generic service name comprises appending location-specific data to the first generic service name.

39. The machine-readable medium of claim 38, wherein the location-specific data comprises at least one of a Cell ID or an Area ID.

40. The machine-readable medium of claim 38, wherein the location-specific data comprises a Cell ID and an Area ID.

41. The machine-readable medium of claim 37, comprising further machine-executable instructions for performing the following:

receiving a plurality of generic service names from the first wireless network after commencing wireless communication with the first wireless network.

42. The machine-readable medium of claim 41, comprising further machine-executable instructions for performing the following:

receiving an update of generic service names while in wireless communication with the first wireless network.

43. The machine-readable medium of claim 37, wherein:

at least one generic service name has a plurality of corresponding language-specific generic service names, and each of the language-specific generic service names has an associated language, and comprising further machine-executable instructions for performing the following:

displaying, upon selection of the at least one generic service name, one or more language-specific generic service names having an associated language matching a preferred language setting of a mobile terminal.

44. The machine-readable medium of claim 37, wherein said second subset of non-default generic service names are mapped to distinct information sources.

45. The machine-readable medium of claim 37, wherein said machine-readable medium is a memory.

* * * * *

UNITED STATES PATENT AND TRADEMARK OFFICE
CERTIFICATE OF CORRECTION

| | |
|---|---|
| PATENT NO. | : 7,305,252 B2 |
| APPLICATION NO. | : 10/730008 |
| DATED | : December 4, 2007 |
| INVENTOR(S) | : Lysaa Britt et al. |

It is certified that error appears in the above-identified patent and that said Letters Patent is hereby corrected as shown below:

In Column 16, Claim 9, Lines 7-10:
　　Please replace the section reading, "displaying, upon. . .mobile terminal." with the following:
--　　each generic service name in a first subset of the plurality is mapped by the first wireless network to a distinct non-default information resource, and
　　each generic service name in a second subset of the plurality is mapped by the second wireless network to a distinct non-default information resource, and further comprising:
　　submitting a generic service name of the first subset to the first wireless network;
　　accessing, in a response to said submission, the non-default information resource mapped to said first subset generic service name by the first wireless network;
　　submitting to the first wireless network a third generic service name not mapped by the first wireless network to a non-default information resource; and
　　accessing the default information resource associated with the third generic service name. --

In Column 16, Claim 11, Line 25 to Column 17, Claim 11, Line 35:
　　Please replace the section reading, "a communications interface. . .generic service name." with the following:
--　　displaying, upon selection of the at least one generic service name, a language-specific generic service name having an associated language matching a preferred language setting of the mobile terminal. --

In Column 17, Claim 15, Line 56 to Column 18, Claim 15, Line 5:
　　Please replace the section reading, "each generic service. . .generic service names." with the following:
--　　a communications interface configured to provide two-way communication via a wireless network between the apparatus and other locations;
　　an input device;
　　a processor; and
　　a memory, the memory having stored thereon machine-executable instructions which, when executed by the processor, cause the apparatus to perform the following:

UNITED STATES PATENT AND TRADEMARK OFFICE
CERTIFICATE OF CORRECTION

| | |
|---|---|
| PATENT NO. | : 7,305,252 B2 |
| APPLICATION NO. | : 10/730008 |
| DATED | : December 4, 2007 |
| INVENTOR(S) | : Lysaa Britt et al. |

It is certified that error appears in the above-identified patent and that said Letters Patent is hereby corrected as shown below:

(continued from previous page)

storing a plurality of generic service names,
receiving a user selection of an information category corresponding to a first of the plurality of generic service names,
transmitting, to a first wireless network, a request for a sub-level of generic service names assigned to the information category,
receiving, from the first wireless network in response to the request, a list of generic services names of the sub-level,
displaying a plurality of said generic service names of the sub-level,
receiving a user selection of one of the sub-level generic service names,
transmitting the selected sub-level generic service name via wireless communication link with the first wireless network,
accessing, in response to transmission of the selected sub-level generic service name via the wireless communication link with the first wireless network, a first Internet information resource,
receiving a user selection of an information category corresponding to a second of the plurality of generic service names,
transmitting the second generic service name via the wireless communication link with the first wireless network,
accessing, in response to transmission of the second generic service name via the wireless communication link with the first wireless network, a second Internet information resource,
receiving a user reselection of an information category corresponding to the first or second of the plurality of generic service names,
transmitting the generic service name corresponding to the reselected category via a wireless communication link with a second wireless network,
accessing, in response to transmission of the corresponding generic service name, a third Internet information resource, the third Internet information resource being different from the first or second Internet information resources;
wherein the first and second generic service names are upper level generic service names in a generic service name tree that comprises multiple hierarchically arranged lower levels of generic service names,
each of a plurality of generic service names in the tree is associated with a default information resource,
each generic service name in a first subset of the plurality is mapped by the first wireless network to a distinct non-default information resource,

UNITED STATES PATENT AND TRADEMARK OFFICE
CERTIFICATE OF CORRECTION

| | | |
|---|---|---|
| PATENT NO. | : 7,305,252 B2 | |
| APPLICATION NO. | : 10/730008 | |
| DATED | : December 4, 2007 | |
| INVENTOR(S) | : Lysaa Britt et al. | |

It is certified that error appears in the above-identified patent and that said Letters Patent is hereby corrected as shown below:

(continued from previous page)

each generic service name in a second subset of the plurality is mapped by the second wireless network to a distinct non-default information resource, and
           the memory has stored thereon additional machine-executable instructions which, when executed by the processor, cause the apparatus to perform a method comprising:
           transforming a generic service name of the first subset to the first wireless network,
           accessing, in response to said transmission, the non-default information resource mapped to said first subset generic service name by the first wireless network,
           transmitting to the first wireless network a third generic service name not mapped by the first wireless network to a non-default information resource, and
           accessing the default information resource associated with the third generic service name. --

In Column 20, Claim 29, Lines 15-42:
      Please replace the section reading, ". . .Internet information. . .in the communication." with the following:
-- Internet information resources based upon different combinations of the generic service name and values for at least one of a Cell ID and an Area ID,
           storing a second plurality of generic service names in a database in the memory, each generic service name in the second plurality being mapped to a single distinct Internet information resource without regard to a value for a Cell ID or an Area ID,
           receiving communications from mobile terminals via the communications interface, each communication containing a generic service name of the first or second plurality appended to a value for at least one of a Cell ID and an Area ID,
           providing, in response to each of the communications from mobile terminals containing a generic service name of the first plurality, direction to the resource mapped to the combination of the generic service name and Cell ID or Area ID value in the communication,
           providing, in response to each of the communications from mobile terminals containing a generic service name of the second plurality, direction to the resource mapped to the generic service name,

UNITED STATES PATENT AND TRADEMARK OFFICE
CERTIFICATE OF CORRECTION

| | | |
|---|---|---|
| PATENT NO. | : 7,305,252 B2 | |
| APPLICATION NO. | : 10/730008 | |
| DATED | : December 4, 2007 | |
| INVENTOR(S) | : Lysaa Britt et al. | |

It is certified that error appears in the above-identified patent and that said Letters Patent is hereby corrected as shown below:

(continued from previous page)

detecting a discovery request in a communication received from a requesting mobile terminal, said discovery request accompanied by an identification of a category of information, and
    in response to detecting said discovery request, providing a multi-level hierarchical directory of generic service names to said request mobile terminal for a display to a user. --

In Column 20, Claim 30, Lines 44-59:
    Please replace the section reading, "each of the generic. . .in the communication." with the following:
--     each generic service name in the first plurality is mapped to multiple Internet information resources based upon different combinations of the generic service name, values for a Cell ID and values for an Area ID,
    each generic service name in a third plurality is mapped to multiple Internet information resources based upon different combinations of the generic service name and values for an Area ID,
    the processor is configured to receive communications from mobile terminals via the communications interface, each communication containing a generic service name of the first, second or third plurality appended to a value for a Cell ID and a value for an Area ID,
    mobile terminals communicating a generic service name from the first plurality are directed to an Internet information resource based on the combination of the generic service name and the Cell ID and Area ID values in the communication, and
    the processor is further configured to provide, in response to each of the communications from mobile terminals containing a generic service name from the third plurality, direction to the resource mapped to the combination of the generic service name and Area ID value in the communication. --

UNITED STATES PATENT AND TRADEMARK OFFICE
CERTIFICATE OF CORRECTION

| | | |
|---|---|---|
| PATENT NO. | : 7,305,252 B2 | |
| APPLICATION NO. | : 10/730008 | |
| DATED | : December 4, 2007 | |
| INVENTOR(S) | : Lysaa Britt et al. | |

It is certified that error appears in the above-identified patent and that said Letters Patent is hereby corrected as shown below:

In Column 20, Claim 33, Line 65 to Column 21, Claim 33, Line 27:
    Please replace the section reading, "resources based. . .display to a user." with the following:
--     each of the generic service names of the first plurality is mapped to multiple distinct Internet information resources based on different combinations of the generic service name, language preferences and values for at least one of a Cell ID and an Area ID,
    the processor is configured to receive communications from mobile terminals containing a generic service name of the first plurality appended to a language preference and to a value for at least one of a Cell ID or an Area ID, and
    the processor is configured to provide, in response to each of the communications from mobile terminals containing a generic service name of the first plurality, direction to the resource mapped to the combination of the generic service name, language preference and Cell ID or Area ID value in the communication. --

Signed and Sealed this

Seventeenth Day of February, 2009

JOHN DOLL
*Acting Director of the United States Patent and Trademark Office*